United States Patent
Shinya et al.

(10) Patent No.: US 8,555,663 B2
(45) Date of Patent: Oct. 15, 2013

(54) REFRIGERATING APPARATUS

(75) Inventors: Hidetoshi Shinya, Osaka (JP); Susumu Kobayashi, Osaka (JP); Satoshi Okuda, Osaka (JP); Ryuichi Tsuruma, Osaka (JP); Yuichi Tamaoki, Osaka (JP); Ryuzo Tobe, Osaka (JP)

(73) Assignee: Panasonic Healthcare Co., Ltd., Ehime (JP)

( * ) Notice: Subject to any disclaimer, the term of this patent is extended or adjusted under 35 U.S.C. 154(b) by 547 days.

(21) Appl. No.: 12/854,822

(22) Filed: Aug. 11, 2010

(65) Prior Publication Data
US 2011/0030402 A1 Feb. 10, 2011

Related U.S. Application Data

(63) Continuation of application No. PCT/JP2009/066275, filed on Sep. 17, 2009.

(30) Foreign Application Priority Data

Sep. 22, 2008 (JP) ................................. 2008-243064

(51) Int. Cl.
F25B 7/00 (2006.01)
F25B 49/00 (2006.01)

(52) U.S. Cl.
USPC ................ 62/175; 62/181; 62/183; 62/228.5; 62/229

(58) Field of Classification Search
USPC ............. 62/175, 181, 183, 186, 228.1, 228.5, 62/229
See application file for complete search history.

(56) References Cited

U.S. PATENT DOCUMENTS

2006/0032252 A1* 2/2006 Lee et al. .................. 62/175

FOREIGN PATENT DOCUMENTS

| JP | 56-79018 | 6/1981 |
|---|---|---|
| JP | 01-203863 | 8/1989 |
| JP | 04-340197 | 11/1992 |
| JP | 5-34045 | 2/1993 |
| JP | 05-250554 | 9/1993 |
| JP | 06-42845 | 2/1994 |
| JP | 6-109335 | 4/1994 |
| JP | 11-211325 | 8/1999 |
| JP | 2005-90917 | 4/2005 |

OTHER PUBLICATIONS

JP Office Action issued JP 2008-243064.

(Continued)

*Primary Examiner* — Marc Norman
(74) *Attorney, Agent, or Firm* — McDermott Will & Emery LLP

(57) ABSTRACT

A refrigerating apparatus includes first and second refrigerant circuits including respective first and second compressors, condensers, pressure reducers, and evaporators, connected circularly with first and second refrigerant pipes, respectively, refrigerants discharged from the first and second compressors being respectively condensed at the first and second condensers and thereafter respectively evaporated at the first and second evaporators to acquire a cooling effect; a temperature sensor that detects a temperature of an internal portion of a cold storage cabinet, the first and second evaporators being disposed to cool the internal portion simultaneously; and a first control device that controls the first and second compressors such that both of them are operated each time a temperature detected by the temperature sensor reaches a first temperature, and the first and second compressors are alternately operated each time a temperature detected by the temperature sensor reaches a second temperature lower than the first temperature.

15 Claims, 18 Drawing Sheets

(56) References Cited

OTHER PUBLICATIONS

Patent Abstracts of Japan for patent application with Publication No. 05-034045, Publication Date: Feb. 9, 1993, 1 page.
Mechanical English translation of Patent Application with Publication No. 05034045, Publication Date: Feb. 9, 1993, 7 pages.
Patent Abstracts of Japan with Publication No. 56-079018, Publication Date: Jun. 29, 1981, 1 page.
Patent Abstracts of Japan for patent application with Publication No. 2005-090917, Publication Date: Apr. 7, 2005, 1 page.
Mechanical English Translation for patent application with Publication No. 2005-090917, Publication Date: Apr. 7, 2005, 9 pages.
Patent Abstracts of Japan for patent application with Publication No. 06-109335, Publication Date: Apr. 19, 1994, 1 page.
Mechanical English translation for patent application with Publication No. 06-109335, Publication Date: Apr. 19, 1994, 4 pages.
Office Action mailed Jan. 18, 2013 issued in corresponding JP Patent Application No. 2008-241351.

* cited by examiner

REFRIGERATING APPARATUS

CROSS-REFERENCE TO RELATED APPLICATIONS

This is a continuation application of International Patent Application No. PCT/JP2009/66275 filed Sep. 17, 2009, which claims the benefit of priority to Japanese Patent Application No. 2008-243064 filed Sep. 22, 2008. The full contents of the International Patent Application are incorporated herein by reference.

BACKGROUND OF THE INVENTION

1. Field of the Invention

The present invention relates to a refrigerating apparatus.

2. Description of the Related Art

A refrigerating apparatus is known that includes two refrigerant circuits having compressors, condensers, pressure reducers, and evaporators (see, e.g., Japanese Patent Application Laid-Open Publication No. 2005-90917). Since the refrigerant discharged from the compressor in each of the two refrigerant circuits is cooled and liquefied by the condenser and evaporated by the evaporator after the depressurization by the pressure reducer, for example, an internal portion of a cold storage cabinet in thermal contact with the two evaporators in common is cooled.

This refrigerating apparatus includes a temperature sensor that detects a temperature of the internal portion, and controls the respective compressors of the two refrigerant circuits in the following manner, for example. That is, when one or both of the compressors of the two refrigerant circuits are operated, a temperature detected by the temperature sensor drops from an upper limit to a lower limit of a preset temperature range, and when both of the compressors of the two refrigerant circuits are stopped, a temperature detected by the temperature sensor increases from the lower limit to the upper limit of the preset temperature range. As above, the temperature of the internal portion is maintained within the preset temperature range by alternately performing an operation of one or two of the compressors and a stopping of the two compressors.

To accurately control the temperature in the internal portion (i.e., to maintain within a predetermined set temperature range) in the refrigerating apparatus even in a case where an internal load has been increased due to an increase in an ambient temperature, etc., it is necessary to relatively increase frequency (number of times per unit time) of periods during which both of the two compressors are in operation by, for example, operating both of the two compressors during the period of operating the compressors and shortening the period in which both of the compressors are stopped.

However, in this case, since the number of activations of the compressors is increased there are drawbacks including not only the shortening of lives of electric components such as relays but also an increase in power consumption due to activation current.

It is therefore the object of the present invention to accurately control the internal temperature while suppressing the number of activations of the compressors.

SUMMARY OF THE INVENTION

A refrigerating apparatus according to an aspect of the present invention, comprises: a first refrigerant circuit including a first compressor, a first condenser, a first pressure reducer, and a first evaporator, connected circularly with a first refrigerant pipe, a refrigerant discharged from the first compressor being condensed at the first condenser and thereafter evaporated at the first evaporator to acquire a cooling effect; a second refrigerant circuit including a second compressor, a second condenser, a second pressure reducer, and a second evaporator, connected circularly with a second refrigerant pipe, a refrigerant discharged from the second compressor being condensed at the second condenser and thereafter evaporated at the second evaporator to acquire a cooling effect; a temperature sensor configured to detect a temperature of an internal portion of a cold storage cabinet, the first evaporator and the second evaporator being disposed to cool the internal portion at the same time; and a first control device configured to control the first compressor and the second compressor in such a manner that both the first compressor and the second compressor are operated each time a temperature detected by the temperature sensor reaches a first temperature, and the first compressor and the second compressor are alternately operated each time a temperature detected by the temperature sensor reaches a second temperature lower than the first temperature.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 14A is a plan view of an exemplary arrangement of first and second compressors, first and second fans, and a condensing unit of a refrigerant circuit of a second embodiment

DETAILED DESCRIPTION OF THE INVENTION

At least the following details will become apparent from descriptions of this specification and of the accompanying drawings.

First Embodiment

=Configuration of Refrigerating Apparatus=

An exemplary configuration of a refrigerating apparatus 1 of a first embodiment will be described with reference to FIGS. 1 to 4.

Figure 1:
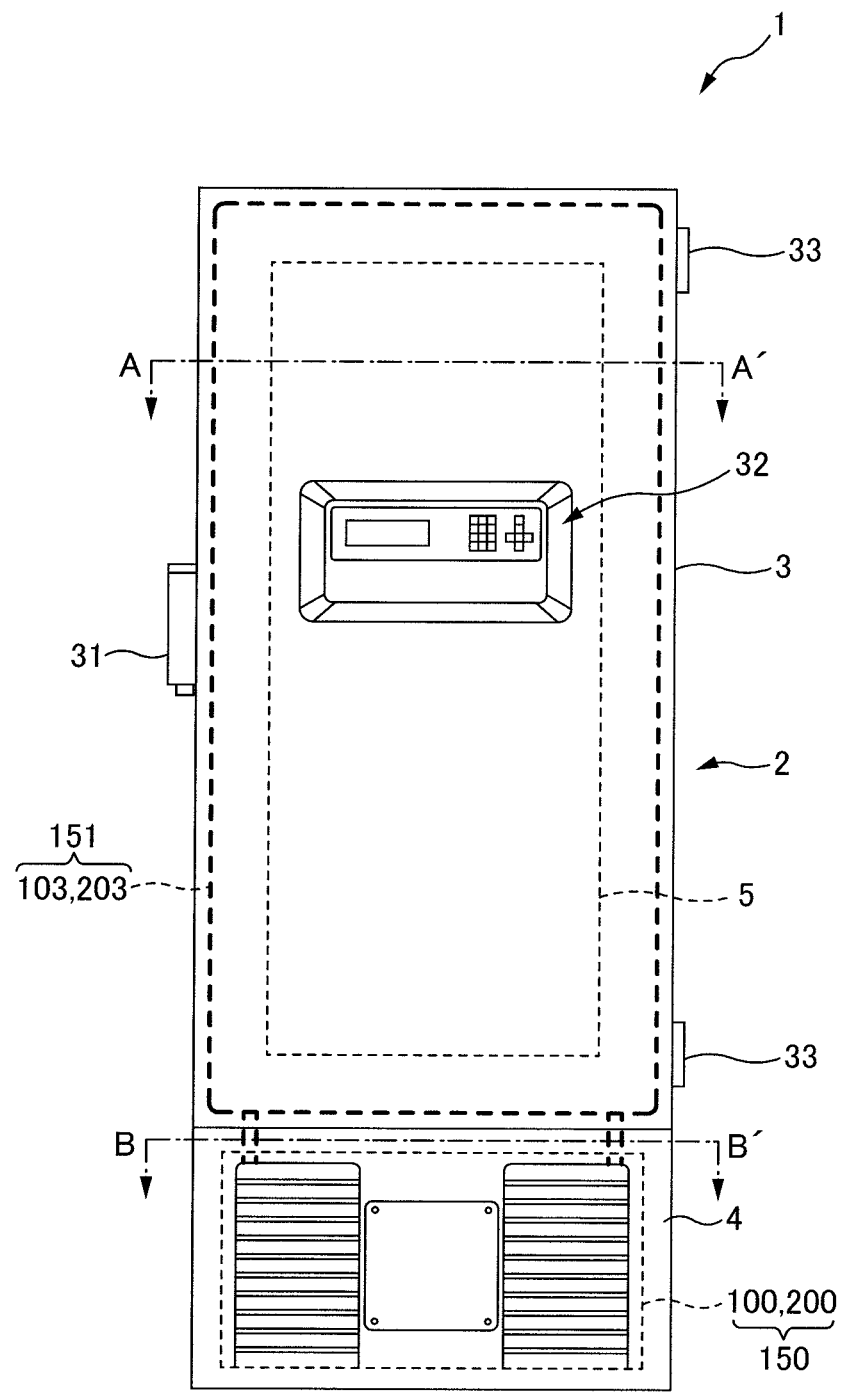
FIG. 1 is a front view of an example of a refrigerating apparatus according to a first embodiment.
Figure 2:
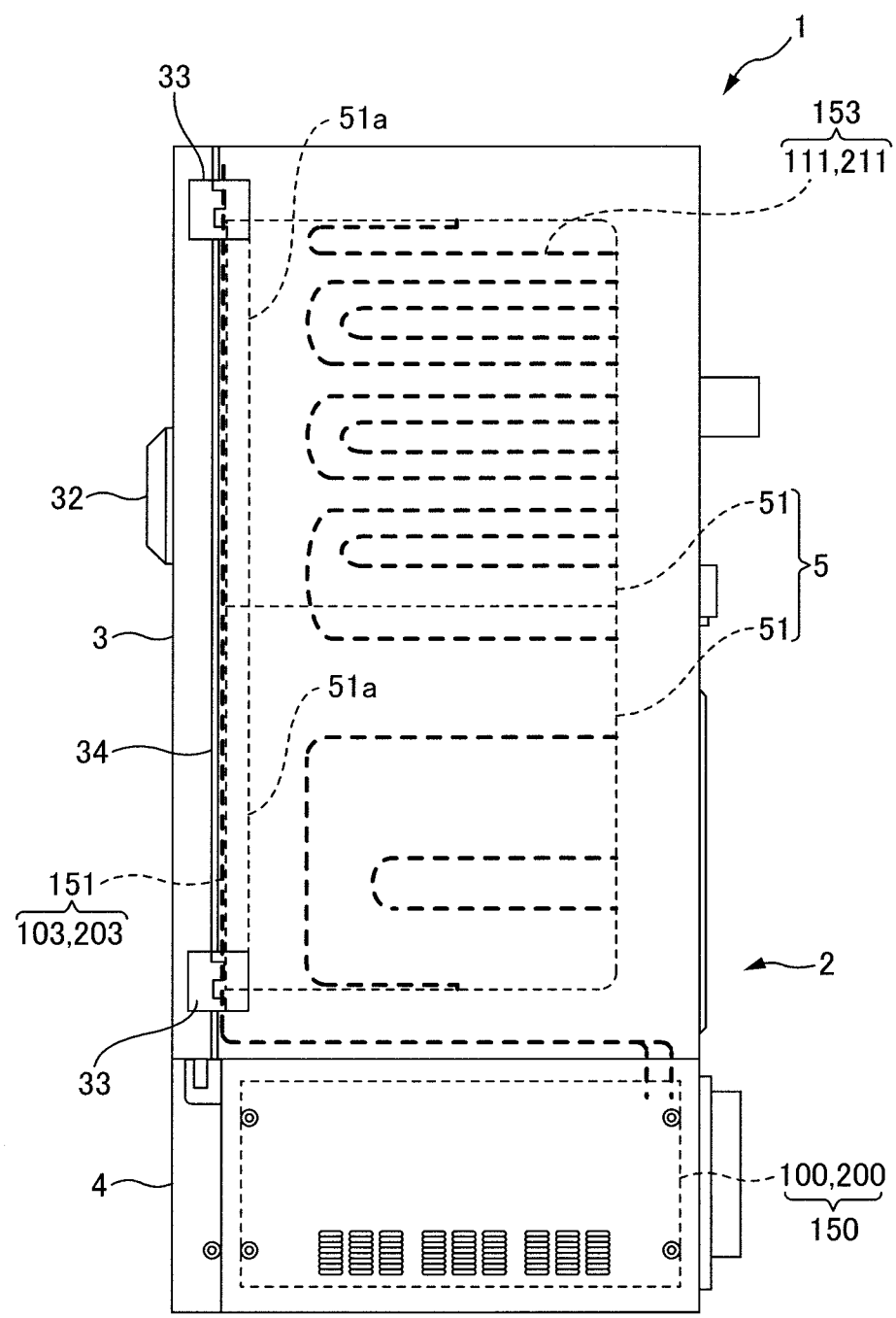
FIG. 2 is a side view of the refrigerating apparatus of FIG. 1.
Figure 3:
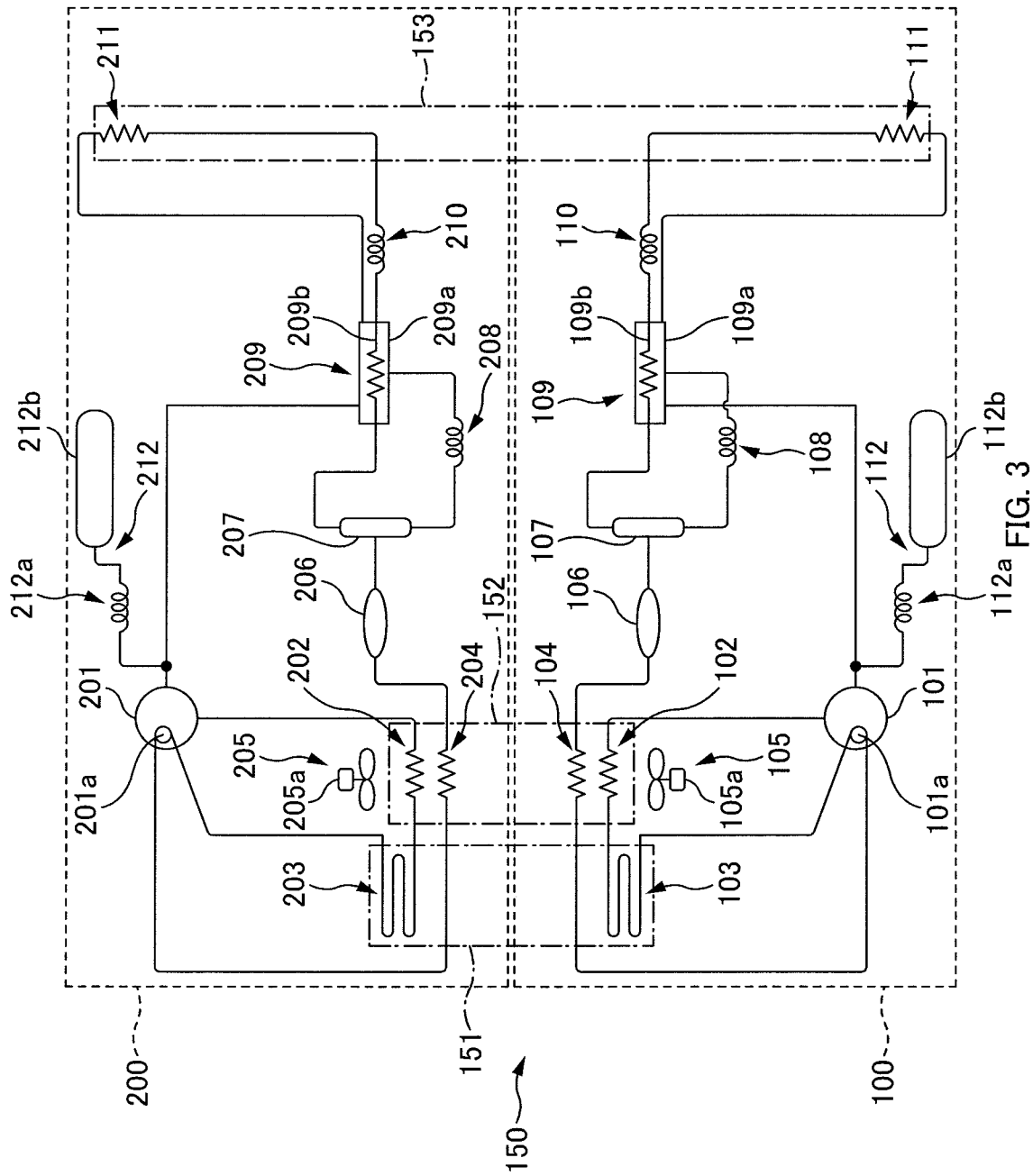
FIG. 3 is a circuit diagram of an example of a first refrigerant circuit and a second refrigerant circuit of the first embodiment.
Figure 4:
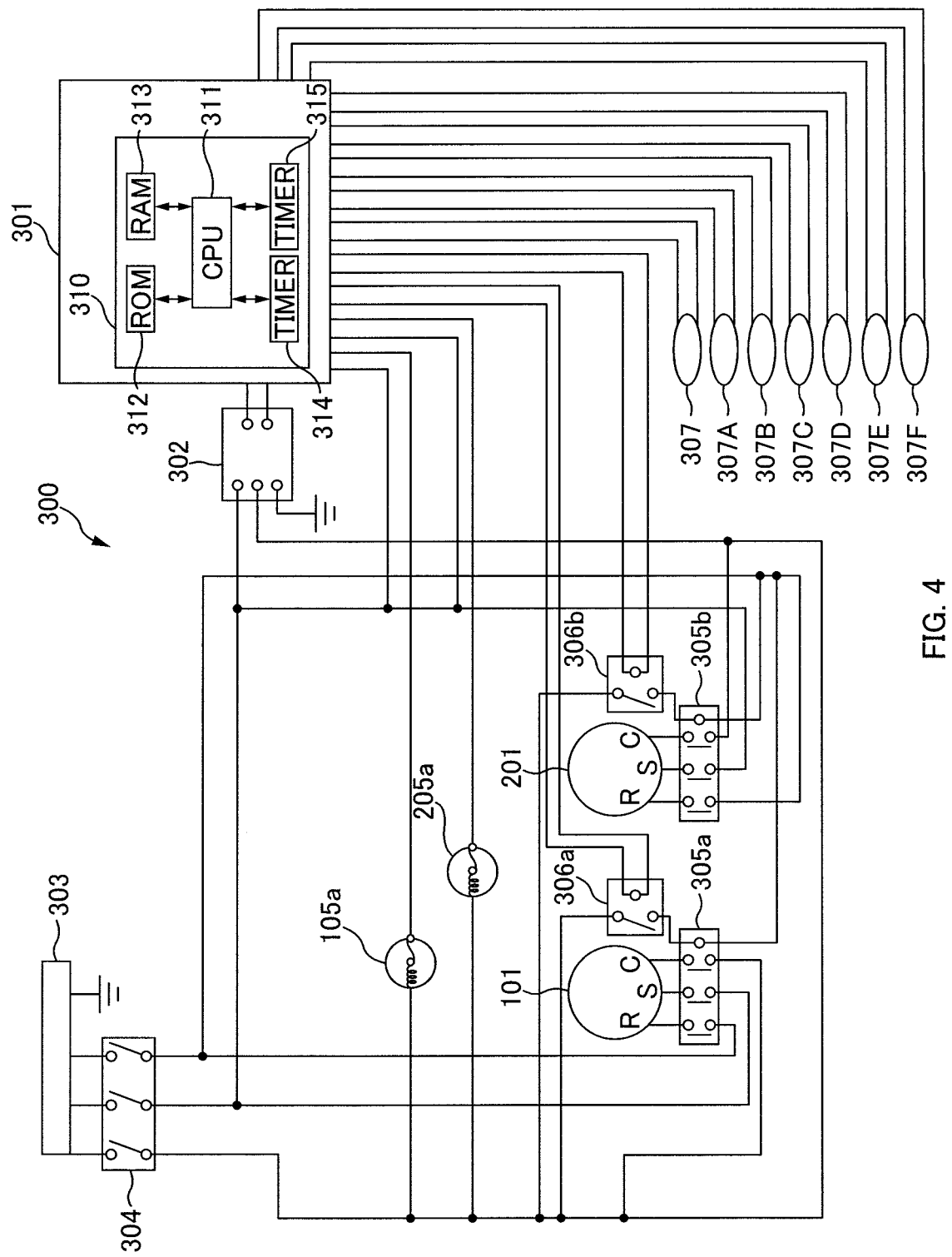
FIG. 4 is a block diagram of an example of a control circuit responsible for controlling the first refrigerant circuit and the second refrigerant circuit of the first embodiment.

FIG. 1 is a front view of an example of the refrigerating apparatus 1 of the first embodiment. FIG. 2 is a side view of the refrigerating apparatus 1 of FIG. 1. FIG. 3 is a circuit diagram of an example of a first refrigerant circuit 100 and a second refrigerant circuit 200 of the first embodiment. FIG. 4 is a block diagram of an example of a control circuit 300 responsible for controlling the first refrigerant circuit 100 and the second refrigerant circuit 200 of the first embodiment.

As depicted in FIGS. 1 to 4, the refrigerating apparatus 1 includes two substantially the same refrigerant circuits (the first refrigerant circuit 100 and the second refrigerant circuit 200), a temperature sensor 307 that detects an internal temperature, a microcomputer (a first control device, a second control device, an identifying device, a first switching device, a second switching device and a determining device) 310, compressor relays (a first control device and a second control device) 305a, 305b, and relays (a first control device and a second control device) 306a, 306b.

As depicted in FIGS. 1 and 2, the refrigerating apparatus 1 further includes an inner case 5, an outer case (thermally insulating housing) 2, an inner door 51a, an outer door (thermally insulating door) 3, and a machine chamber 4, and, in the exemplary depiction of FIGS. 1 and 2, the first refrigerant circuit 100 and the second refrigerant circuit 200 are almost entirely stored in the machine chamber 4 except for an evaporator 153, heat exchangers 109, 209, etc., which will be described later.

The inner case 5 is a substantially rectangular parallelepiped box made of sheet steel, for example, and is separated into, for example, two storage chambers 51 configured to store objects to be stored such as frozen objects and biological tissues. Respective front openings of the two storage chambers 51 are provided with the two respective inner doors 51a made of, for example, resin that are provided in an openable/closable manner via predetermined hinges (not depicted).

The outer case 2 is a substantially rectangular parallelepiped box made of sheet steel, for example, and houses the machine chamber 4 and the inner case 5. Particularly, a predetermined heat insulating material (not depicted) is filled between the inner case 5 and the outer case 2. The front opening of the outer case 2 is provided with the outer door 3 for taking and putting stored objects out of and into the storage chamber 51 that are attached in an openable/closable manner via hinges 33. The outer door 3 is, for example, a substantially flat-plate-shaped hollow body made of sheet steel filled with a predetermined heat insulating material (not depicted) with a rear surface thereof being provided with packing 34 configured to ensure air-tightness of the outer case 2 and a front surface thereof being provided with, for example, an operation panel 32 having keys configured to set a desired internal temperature (in the storage chamber 51) and a display configured to display the current internal temperature.

A handle 31 depicted in FIG. 1 enables the opening/closing operation of the outer door 3 by a user, etc., and has a predetermined lock mechanism (not depicted) configured to fix and unfix a state in which the outer door 3 is closing a front opening of the outer case 2.

<<Refrigerant Circuit>>

As depicted in FIG. 3, the first refrigerant circuit 100 includes a first compressor 101, a pre-condenser 102 and a condenser 104 (a first condenser), a pressure reducer 110 (a first pressure reducer), and a first evaporator 111 and is configured circularly with a predetermined pipe (a first refrigerant pipe) in such a manner that a refrigerant discharged from the first compressor 101 returns to the same compressor 101 again. The first refrigerant circuit 100 further includes a flow divider 107 that divides air and liquid, a pressure reducer 108, and a heat exchanger 109. The first refrigerant circuit 100 further includes an oil cooler 101a in an oil pocket within the first compressor 101, includes a pipe 103 between the pre-condenser 102 and the oil cooler 101a, includes a dehydrator 106 between the condenser 104 and the flow divider 107, and further includes a buffer 112 between a suction side of the first compressor 101 and the heat exchanger 109.

The first compressor 101 compresses and discharges the sucked refrigerant to the pre-condenser 102.

The pre-condenser 102 is, for example, a pipe made of copper or aluminum provided in a meandering manner and configured to radiate heat from the refrigerant discharged from the first compressor 101. The condenser 104 is, for example, a pipe made of copper or aluminum provided in a meandering manner and configured to further radiate heat from the refrigerant outputted from the pre-condenser 102. The pre-condenser 102 and the condenser 104 are integrally configured on the same tube plate, for example. A fan 105 is disposed in the vicinity of the pre-condenser 102 and the condenser 104 and is configured to send air to the condensers 102, 104 at the same time.

The flow divider 107 divides a flow of refrigerant outputted from the condenser 104 into a liquid-phase refrigerant and a gas-phase refrigerant, outputs the liquid-phase refrigerant to the pressure reducer 108 (capillary tube), and outputs the gas-phase refrigerant to an inner pipe 109b of the heat exchanger 109.

The heat exchanger 109 is, for example, a double pipe made of copper or aluminum having an outer pipe 109a and an inner pipe 109b and cools the gas-phase refrigerant flowing through the inner pipe 109b by an evaporation of the liquid-phase refrigerant, depressurized by the pressure reducer 108, in the outer pipe 109a.

The pressure reducer 110 is, for example, a capillary tube that depressurizes the refrigerant that is cooled and changed into the liquid phase in the inner pipe 109b of the heat exchanger 109 and outputs the refrigerant to the first evaporator 111.

The first evaporator 111 is, for example, a pipe made of copper or aluminum configured to evaporate the refrigerant depressurized by the pressure reducer 110 and is affixed in a thermally contacting manner to the outer surface of the inner case 5 except for the front opening. The inside is cooled due to the cooling effect at the time of evaporation (vaporization) of the refrigerant by the first evaporator 111. The refrigerant evaporated and changed to the gas phase is sucked by the compressor 101 along with the above refrigerant evaporated in the outer pipe 109a of the heat exchanger 109.

The dehydrator 106 removes moisture contained in the refrigerant. The buffer 112 has a capillary tube 112a and an expansion tank 112b and an amount of the refrigerant circulating through the first refrigerant circuit 100 is properly maintained by receiving the gas-phase refrigerant on the suction side of the first compressor 101 in the expansion tank 112b through the capillary tube 112a.

The second refrigerant circuit 200 includes, similarly to the description above, a second compressor 201, a pre-condenser 202 and a condenser 204 (a second condenser), a flow divider 207, a pressure reducer 208, a heat exchanger 209, a pressure reducer 210 (a second pressure reducer), and a second evaporator 211 and is configured circularly with a predetermined pipe (a second refrigerant pipe) in such a manner that a refrigerant discharged from the second compressor 201 returns to the same compressor 201 again, and a refrigerant similar to that described above is sealed therein. Similarly to the description above, the second refrigerant circuit 200 further includes an oil cooler 201a, a pipe 203, a dehydrator 206, and a buffer 212. The heat exchanger 209 has an outer pipe 209a and an inner pipe 209b. The buffer 212 has a capillary tube 212a and an expansion tank 212b. A fan 205 is disposed in the vicinity of the pre-condenser 202 and the condenser 204 and is configured to send air to the condensers 202, 204 at the same time.

As depicted by dot-lines of FIGS. 1 and 2, the pipe 103 and the pipe 203 described above overlap with each other as a frame pipe 151 and are attached on an inner side in a thermally contacting manner to the circumferential portion of the front opening of the outer case 2 (a first refrigerant pipe between the first compressor and the first condenser, and a second refrigerant pipe between the second compressor and the second condenser). The circumferential portion of the front opening is a portion in close contact with the packing 34 in a state where the outer door 3 is closed and this portion is warmed by the frame pipe 151 through which the high-temperature refrigerant discharged from the compressors 101, 201 flows. This prevents condensation on the circumferential portion of the front opening and improves the air-tightness of the outer case 2.

The first evaporator 111 and the second evaporator 211 included in the evaporator 153 are arranged to cool the internal portion at the same time. That is to say, as depicted in FIG. 2, the first evaporator 111 and the second evaporator 211 are each affixed to the outer surface of the inner case 5 except for the front opening in a thermally contacting manner without overlapping each other.

<<Control Circuit>>

The temperature sensor 307 is a sensor that detects the internal temperature and that is attached to a predetermined position inside or outside the inner case 5. The temperature sensor 307 is electrically coupled to a control board 301 as depicted in FIG. 4 and outputs a signal indicating the detected internal temperature to the microcomputer 310.

The microcomputer 310 is mounted on the control board 301 as depicted in FIG. 4 and includes a CPU 311, a ROM 312, and a RAM (an identifying device) 313 to control the operation of the first compressor 101 and the second compressor 201 depending on the temperature detected by the temperature sensor 307, for example. The CPU 311 executes processes related to such control, the ROM 312 stores programs and the like for the CPU 311 to execute such processes, and the RAM 313 stores data necessary for such processes. Particularly, when only one of the first compressor 101 and the second compressor 201 is in operation, the RAM 313 stores information indicating a compressor in operation with a flag "1" linked thereto and stores information indicating a compressor at rest with a flag "0" linked thereto. The microcomputer 310 further includes a timer 314 (a second timer) and a timer 315 (a first timer) configured to measure a changing time of the detected internal temperature, operation times of the compressors 101, 201, etc. The control board 301 is supplied with electric power by a switching power source 302. The switching power source 302 is supplied with electric power through a three-phase power cable 303.

The compressor relay 305a and the compressor relay 305b are, as depicted in FIG. 4, provided for the first compressor 101 and the second compressor 201, respectively, and are relays that are configured to provide electrical connection or interruption between the corresponding compressors 101, 201 and the three-phase power cable 303.

The relay 306a and the relay 306b are, as depicted in FIG. 4, provided for the compressor relay 305a of the first compressor 101 and the compressor relay 305b of the second compressor 201, respectively, and are relays configured to cause the corresponding compressor relays 305a, 305b to perform the above connection and interruption operations based on a control signal outputted from the microcomputer 310.

In the control circuit 300 of the present embodiment, when a manual power switch 304 is turned on, electric power is supplied through the three-phase power cable 303 to the first compressor 101 and the second compressor 201. Fan motors 105a, 205a respectively rotating the fans 105, 205 are supplied with electric power through the three-phase power cable 303 via predetermined relays (not depicted) controlled by the microcomputer 310.

==Operation of Refrigerating Apparatus==

With reference to FIGS. 5 to 12, description will be made of an operation in which the refrigerating apparatus 1 having the above configuration controls the operations of the first compressor 101 and the second compressor 201 in accordance with the detected internal temperature.

Figure 5:
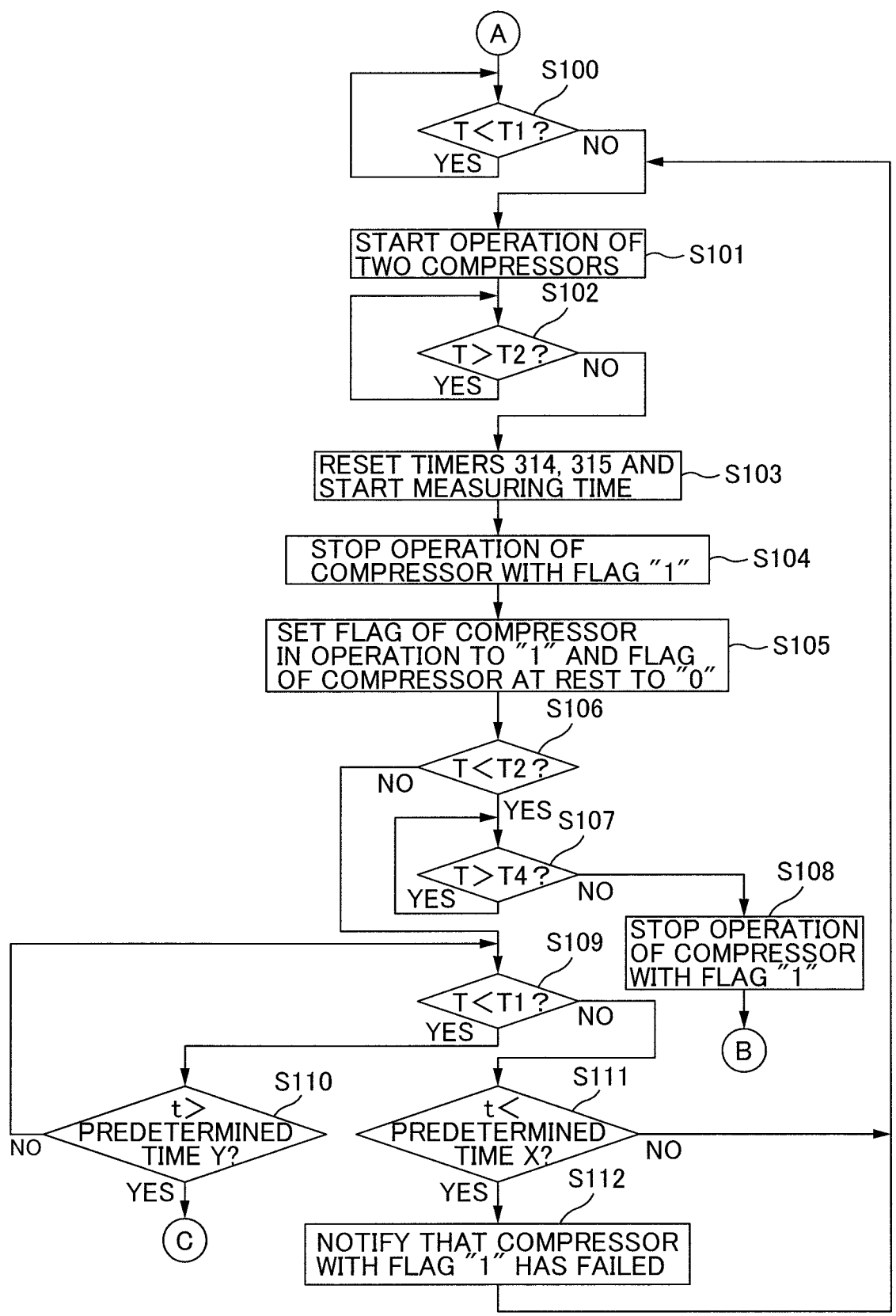
FIG. 5 is a flowchart of an example of a process procedure of a microcomputer in control mode A in which the refrigerating apparatus of the first embodiment alternately repeats a two-compressor operation and a one-compressor operation of a first compressor and a second compressor.

FIG. 5 is a flowchart of an example of a process procedure of the microcomputer 310 in a control mode (control mode A described later) in which the refrigerating apparatus 1 of the first embodiment alternately repeats a two-compressor operation and a one-compressor operation of the first compressor 101 and the second compressor 201.

Figure 6:
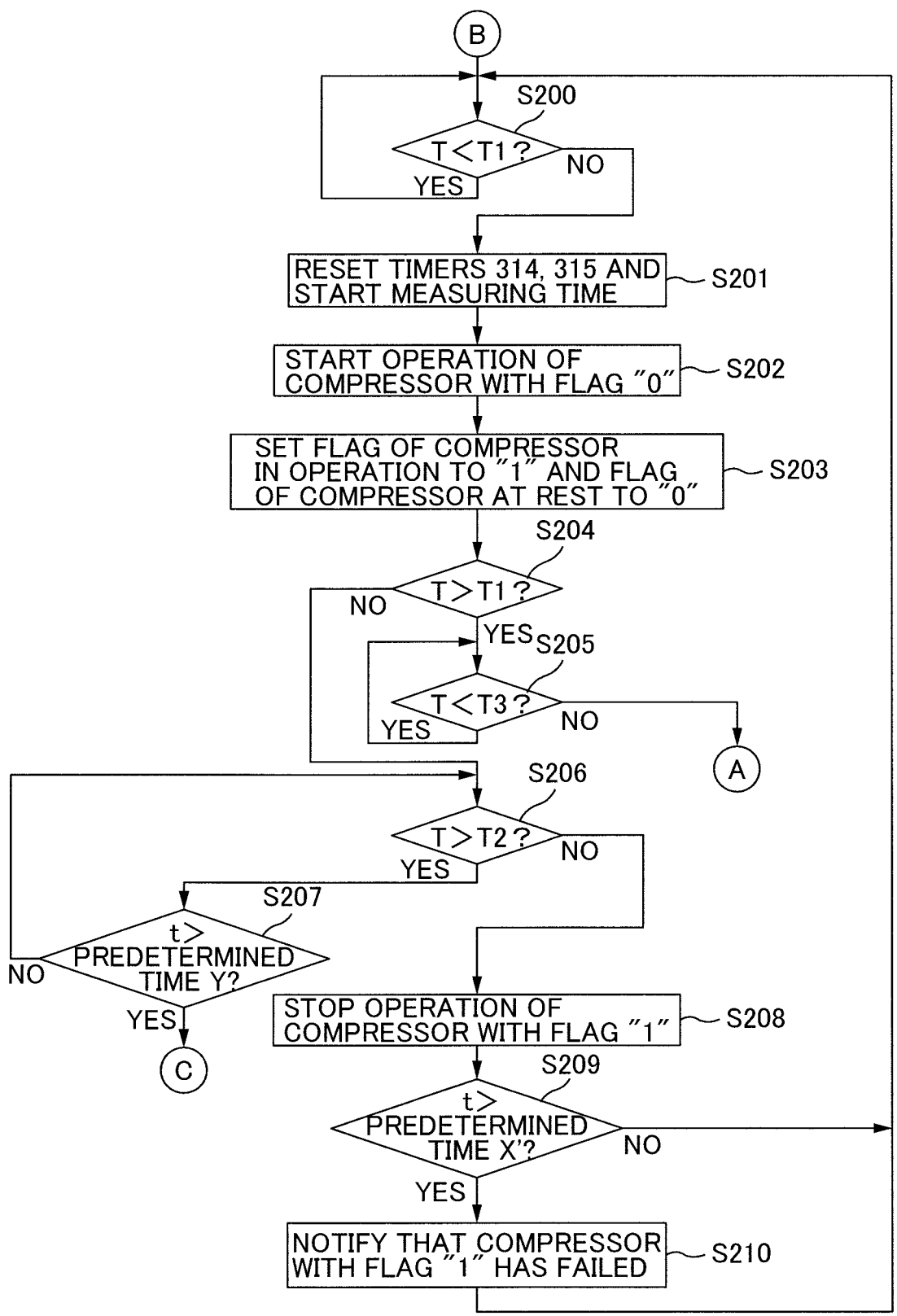
FIG. 6 is a flowchart of an example of a process procedure of the microcomputer in control mode B in which the refrigerating apparatus of the first embodiment alternately repeats a one-compressor operation and a two-compressor stop of the first compressor and the second compressor.

FIG. 6 is a flowchart of an example of a process procedure of the microcomputer 310 in a control mode (control mode B described later) in which the refrigerating apparatus 1 of the first embodiment alternately repeats a one-compressor operation and a two-compressor stop of the first compressor 101 and the second compressor 201.

Figure 7:
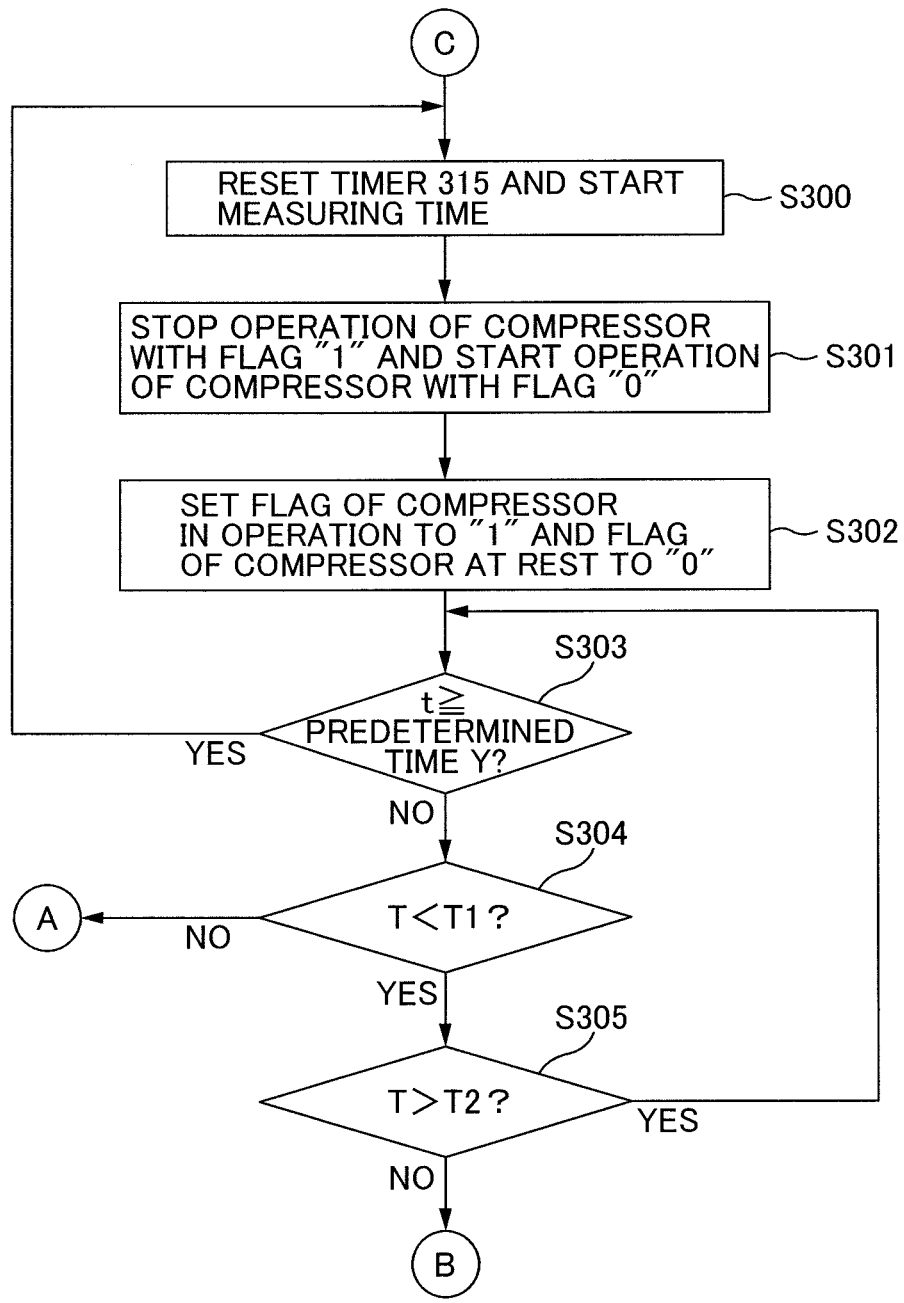
FIG. 7 is a flowchart of an example of a process procedure of the microcomputer in control mode C in which the refrigerating apparatus of the first embodiment alternately repeats a one-compressor operation of one of the first compressor and the second compressor, and a one-compressor operation by the other of the first compressor and the second compressor.

FIG. 7 is a flowchart of an example of a process procedure of the microcomputer 310 in a control mode (control mode C described later) in which the refrigerating apparatus 1 of the first embodiment alternately repeats a one-compressor operation of one of the first compressor 101 and the second compressor 201, and a one-compressor operation of the other of the first compressor 101 and the second compressor 201.

Figure 8:
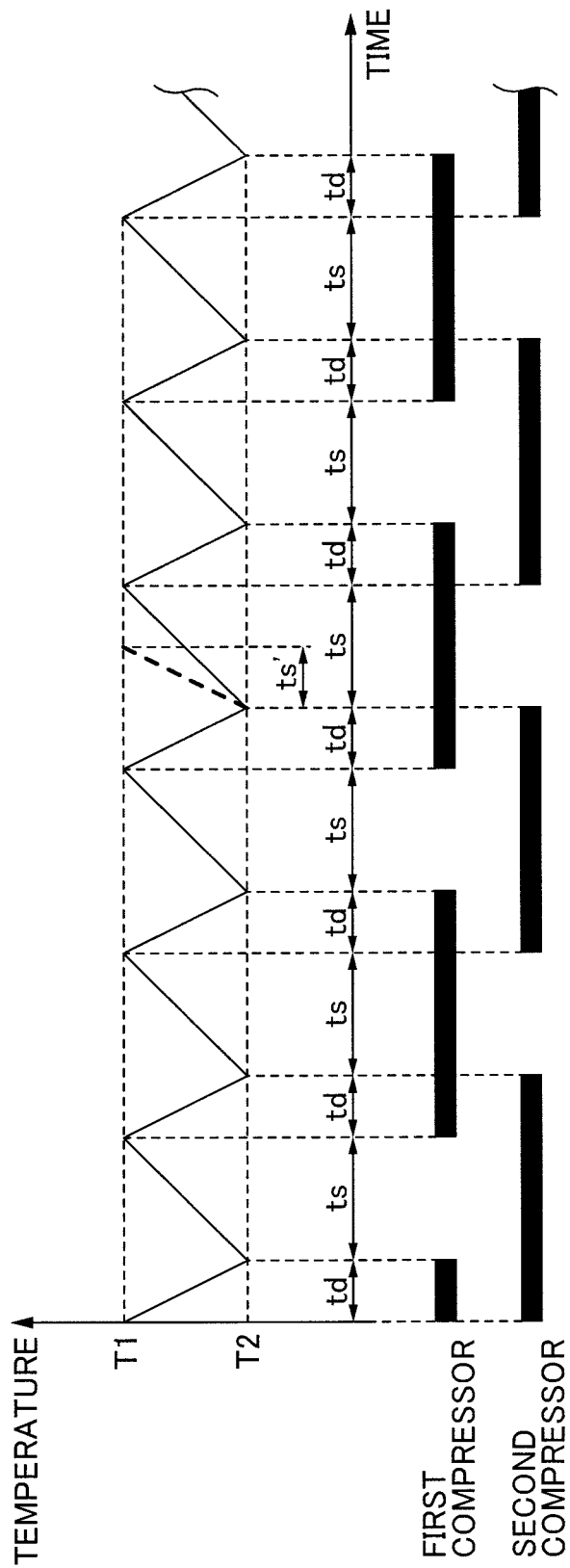
FIG. 8 is a diagram of a relationship between an internal temperature and an operational state of the first compressor and the second compressor when the control mode is A.

FIG. 8 is a diagram showing a relationship between the internal temperature and the operational state of the first compressor 101 and the second compressor 201 for a case in which the control mode is A.

Figure 9:
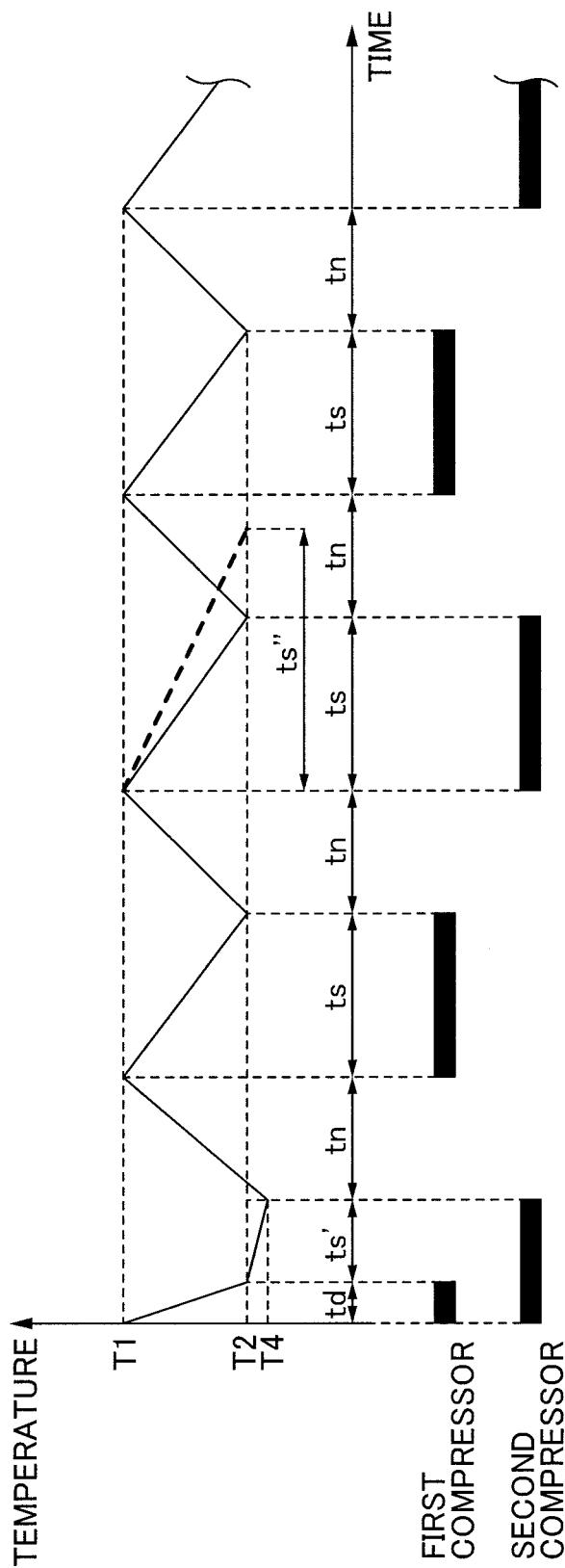
FIG. 9 is a diagram of a relationship between the internal temperature and the operational state of the first compressor and the second compressor when the control mode is switched from A to B.

FIG. 9 is a diagram showing a relationship between the internal temperature and the operational state of the first compressor 101 and the second compressor 201 for a case in which the control mode is switched from A to B.

Figure 10:
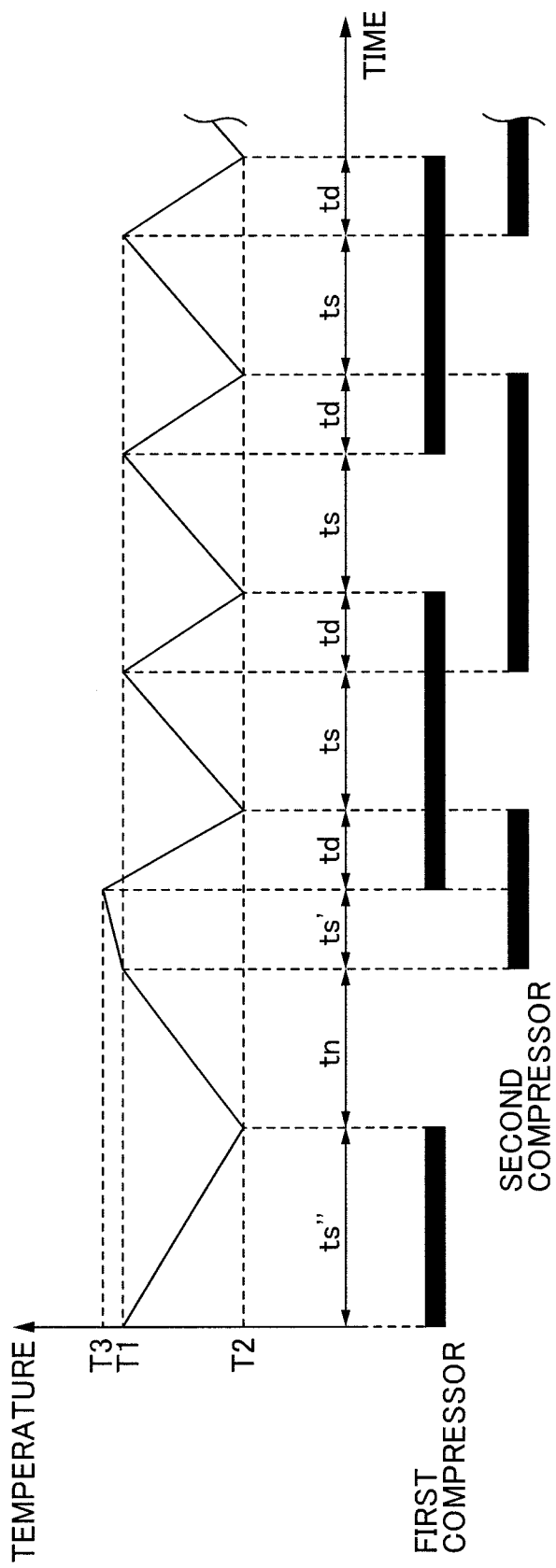
FIG. 10 is a diagram of a relationship between the internal temperature and the operational state of the first compressor and the second compressor when the control mode is switched from B to A.

FIG. 10 is a diagram showing a relationship between the internal temperature and the operational state of the first compressor 101 and the second compressor 201 for a case in which the control mode is switched from B to A.

Figure 11:
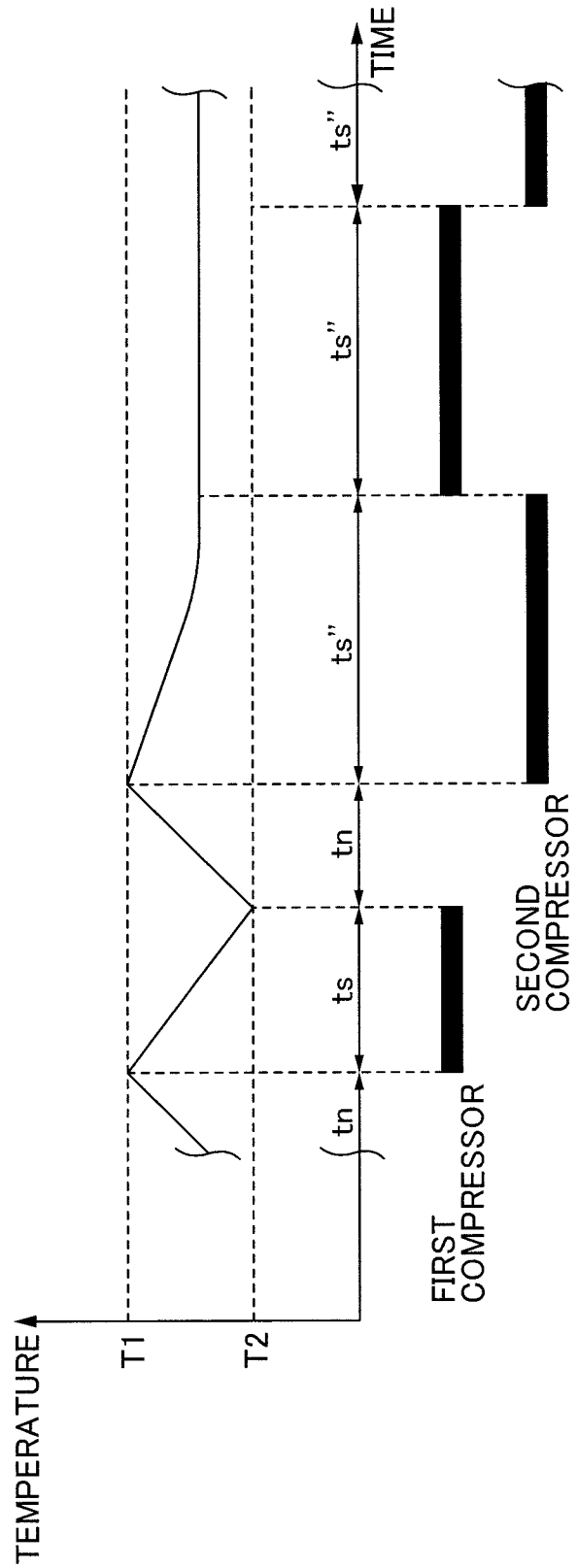
FIG. 11 is a diagram of a relationship between the internal temperature and the operational state of the first compressor and the second compressor when the control mode is switched from B to C.

FIG. 11 is a diagram showing a relationship between the internal temperature and the operational state of the first compressor 101 and the second compressor 201 for a case in which the control mode is switched from B to C.

Figure 12:
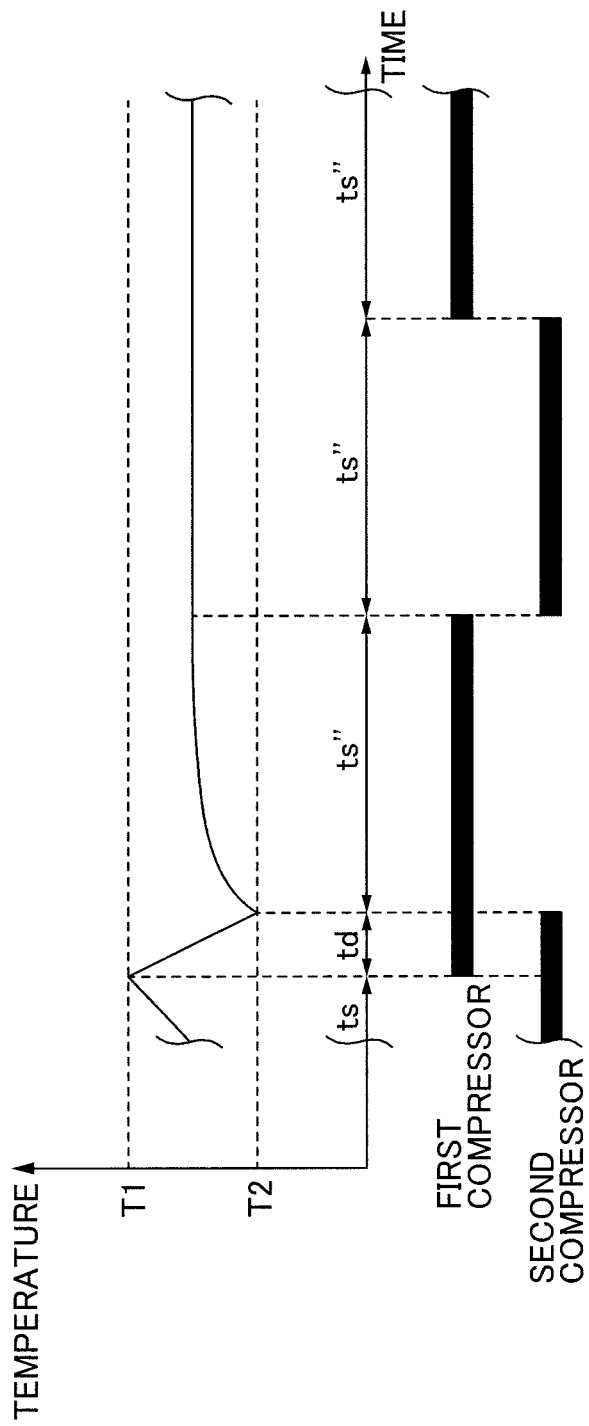
FIG. 12 is a diagram of a relationship between the internal temperature and the operational state of the first compressor and the second compressor when the control mode is switched from A to C.

FIG. 12 is a diagram showing a relationship between the internal temperature and the operational state of the first compressor 101 and the second compressor 201 for a case in which when the control mode is switched from A to C.

<<Control Mode A>>

As depicted in FIG. 5, the microcomputer 310 determines whether a temperature T detected by the temperature sensor 307 (hereinafter referred to as a "detected temperature T") is lower than an upper limit (a first temperature) (hereinafter, "T1") of a preset internal temperature range (S100). If it is determined that the detected temperature T is lower than T1 (S100: YES), the microcomputer 310 executes the process of step S100 again.

If it is determined that the detected temperature T has reached T1 (not lower than T1) (S100: NO), the microcomputer 310 starts operation of the first compressor 101 and the second compressor 201 (S101). While both of the two compressors are being operated, the detected temperature T decreases from T1 toward T2. It is assumed that an internal load is relatively high due to a relatively high ambient temperature, for example. In this case, the internal temperature decreases from T1 toward T2 by the operation of the two compressors, whereas in the case of the operation with only one compressor, as will be described below, the internal temperature increases from T2 toward T1.

The microcomputer 310 determines whether the detected temperature T is higher than a lower limit (a second temperature) (hereinafter, "T2") of the preset internal temperature range (S102). If it is determined that the detected temperature T is higher than T2 (S102: YES), the microcomputer 310 executes the process of step S102 again.

If it is determined that the detected temperature T has reached T2 (not higher than T2) (S102: NO), the microcomputer 310 resets the timers 314, 315, causes them to start measuring time (S103), stops the one of the compressors in operation (the first compressor 101 or the second compressor 201) that is linked to the flag "1" in the RAM 313 (S104), and in the RAM 313, links the flag "1" with the other of the compressors in operation and the flag "0" with the compressor at rest (S105). While only one of the two compressors 101, 201 is being operated, the detected temperature T increases from T2 toward T1.

The microcomputer 310 determines whether the detected temperature T is lower than T2 (S106). If it is determined that the detected temperature T is greater than or equal to T2 (S106: NO), the microcomputer 310 determines whether the detected temperature T is lower than T1 (S109).

If it is determined that the detected temperature T is lower than T1 (S109: YES), the microcomputer 310 determines whether a measured time t from the timer 315 that has started measuring time at the above step S103 is longer than a predetermined time Y (S110). The predetermined time Y is a reference time for determining whether the internal temperature has been stabilized within the preset temperature range and, specifically, if a time period during which the detected temperature T remains between T1 and T2 is longer than the predetermined time Y, it is determined that the internal temperature has been stabilized within the preset temperature range. If it is determined that the measured time t from the timer 315 is less than or equal to the predetermined time Y (S110: NO), the microcomputer 310 executes the process of step S109 again.

If it is determined that the detected temperature T has reached T1 (not lower than T1) (S109: NO), the microcomputer 310 determines whether a measured time t from the timer 314 that has started measuring at the above step S103 is shorter than a predetermined time X (S111). The predetermined time X is a reference time required for the detected temperature T to increase from T2 to T1 during the operation of one compressor that has not failed (the first compressor 101 or the second compressor 201), for example.

If it is determined that the measured time t from the timer 314 is greater than or equal to the predetermined time X (S111: NO), the microcomputer 310 executes the process of step S101 again.

If it is determined that the measured time t of the timer 314 is shorter than the predetermined time X (S111: YES), the microcomputer 310 gives a notification to a user, etc., indicating that the compressor in operation that is linked to the flag "1" has failed through, for example, the display of the operation panel 32 (S112) and executes the process of step S101 again.

As depicted in FIG. 8, since both the first compressor 101 and the second compressor 201 are operated during a time period td in accordance with the above process of the microcomputer 310, the detected temperature T decreases from T1 to T2.

During a subsequent time interval ts, although the second compressor 201 is in operation, since the first compressor 101 is at rest, the detected temperature T increases from T2 to T1. As described above, the flag "1" is linked to the second compressor 201 in operation and the flag "0" is linked to the first compressor 101 at rest.

During a subsequent time interval td, since both the first compressor 101 and the second compressor 201 are in operation, the detected temperature T decreases from T1 to T2.

During a subsequent time interval ts, although the first compressor 101 is in operation, since the second compressor 201 is at rest, the detected temperature T increases from T2 to T1. As described above, first, the second compressor 201 linked to the flag "1" is stopped, and then the flag "1" is linked to the first compressor 101 in operation and the flag "0" is linked to the second compressor 201 at rest.

Hereinafter, similarly, each time the detected temperature T reaches T1, both the first compressor 101 and the second compressor 201 are operated, and each time the detected temperature T reaches T2, the first compressor 101 and the second compressor 201 are alternately operated (control mode A). That is to say, in control mode A, as depicted in FIG. 8, with the detected temperature T being between T1 and T2, a two-compressor operation and a one-compressor operation of the first compressor 101 and the second compressor 201 are alternately repeated, and the first compressor 101 and the second compressor 201 are alternately assigned to the one-compressor operation. Therefore, for example, even in a case where the internal load has been increased due to an increase in an ambient temperature, etc., a frequency of the period during which both of two compressors are in operation (td) may be suppressed since a period during which both of the two compressors 101, 201 are at rest does not exist. A frequency of the period during which only one of them is in operation (ts) may be maintained at the same level between the compressors 101, 201. Therefore, the internal temperature can be accurately controlled while suppressing the number of times of activation of the compressors 101, 201, and in addition, a biased deterioration between the compressors 101, 201 can be prevented. This leads to a longer lifetime and maintenance cycle of the refrigerating apparatus 1 and a reduction in power consumption due to the activation current, etc. In the present embodiment, since the two compressors 101 and 201 are alternately assigned to the above operation of only one compressor, each of the compressors is identified by the flag "0" or "1" stored in the RAM 313. Each of the compressors is effectively identified with a relatively low-cost configuration using one-bit data as above.

In control mode A, as depicted at steps S111: YES and S112 of FIG. 5, when the time required for the detected temperature T to increase from T2 to T1 during the operation of one compressor is shorter than the predetermined time X that is the reference time, it is determined that the one compressor has failed and this is notified. For example, in a plot indicating a temperature change between T1 and T2 in FIG. 8, a time interval ts' of a dot-line portion is shorter than the time interval ts of other portions and this means that the increase of the internal temperature became faster during the operation of the first compressor 101, since the performance of the first compressor 101 has decreased. As a result, since a failure of one of the two compressors 101, 201 is notified at the time of failure, the user, etc., who has been notified, can identify the failed one and repair/replace this compressor while the cooling capacity of the two refrigerant circuits 100, 200 is maintained at a certain level. Such a failure determination may be implemented without separately providing a sensor for diagnosis such as pressure sensor for each of the two compressors 101, 201. Therefore, the decrease in cooling capacity may be suppressed while suppressing the manufacturing cost of the refrigerating apparatus 1.

In the example of FIG. 5, when the microcomputer 310 determines a failure of the compressors, the time required for the detected temperature T of the temperature sensor 307 to increase from T2 to T1 is compared with the predetermined time X that is a reference time, but it is not limited thereto. For example, the microcomputer (computing device, determining device) 310 may determine a failure by obtaining a rate of change in the detected temperature during the period of operating only one compressor (e.g., (T1−T2)/ts) and comparing the rate with a reference rate. For example, if a rate of increase of the detected temperature per unit time is greater than a reference increase rate, it is determined that the corresponding compressor has failed. In the example of FIG. 8, since a rate of increase of the detected temperature during the time interval ts' (<ts) is (T1−T2)/ts' and a rate of increase of the detected temperature during the time interval ts is (T1−T2)/ts it is determined that the first compressor 101 corresponding to the former of a greater value has failed.

Since at least one of the compressors 101, 102 is always operated with the operation in control mode A as above, the high-temperature refrigerant always flows through the above-mentioned frame pipe 151 and the condensation on the circumferential portion of the front opening of the outer case 2 is efficiently prevented. This further improves the air-tightness in the outer case 2.

<<Switching of Control Mode from A to B>>

If it is determined that the detected temperature T is lower than T2 at the above-mentioned step S106 of FIG. 5 (S106: YES), the microcomputer 310 determines whether the detected temperature T is higher than T4 (<T2) (S107).

If it is determined that the detected temperature T is higher than T4 (S107: YES), the microcomputer 310 executes the process of step S107 again.

If it is determined that the detected temperature T has reached T4 (not higher than T4) (S107: NO), the microcomputer 310 stops the compressor in operation that is linked to the flag "1" (S108) and executes the process of control mode B described below. In other words, even after a switching from the operation of the two compressors 101, 201 to the operation of one compressor, if the detected temperature T decreases to T4 (a fourth temperature), which is lower than T2, due to, for example, a decrease in the ambient temperature, control mode A is switched over to control mode B in which both of the two compressors are stopped.

As depicted in FIG. 6, the microcomputer 310 determines whether the detected temperature T from the temperature sensor 307 is lower than T1 (S200). If it is determined that the detected temperature T is lower than T1 (S200: YES), the microcomputer 310 executes the process of step S200 again. As described above, while both of the two compressors 101, 201 are at rest, the detected temperature T increases from T4 toward T1.

If it is determined that the detected temperature T has reached T1 (not lower than T1) (S200: NO), the microcomputer 310 resets the timers 314, 315, causes them to start measuring time (S201), starts operation of the compressor at rest (the first compressor 101 or the second compressor 201) that is linked to the flag "0" (S202), and links the flag "1" to this compressor in operation and the flag "0" to the compressor at rest (S203). While only one of the two compressors 101, 201 is in operation, the detected temperature T decreases from T1 to T2. Here, it is assumed that the internal load is relatively small due to a relatively low ambient temperature as described above. In this case, the internal temperature decreases from T1 toward T2 by operating only one compressor, and the internal temperature increases from T2 toward T1 by stopping the two compressors.

The microcomputer 310 determines whether the detected temperature T is higher than T1 (S204). If it is determined that the detected temperature T is lower than or equal to T1 (S204: NO), the microcomputer 310 determines whether the detected temperature T is higher than T2 (S206).

If it is determined that the detected temperature T is higher than T2 (S206: YES), the microcomputer 310 determines whether a measured time t from the timer 315 that has start measuring at above step S201 is longer than the predetermined time Y (S207). As described above, the predetermined time Y is a reference time for determining whether the internal temperature has been stabilized within the preset temperature range. This predetermined time Y may be the same as or different from the above predetermined time Y. If it is determined that the measured time t from the timer 315 is less than or equal to the predetermined time Y (S207: NO), the microcomputer 310 executes the process of step S206 again.

If it is determined that the detected temperature T has reached T2 (not lower than T2) (S206: NO), the microcomputer 310 stops the compressor in operation that is linked to the flag "1" (S208) and determines whether a measured time t from the timer 314 that has started measuring at the above step S201 is longer than a predetermined time X' (S209). The predetermined time X' is, for example, a reference time required for the detected temperature T to decrease from T1 to T2 by the operation of one compressor having no failure.

If it is determined that the measured time t by the timer 314 is shorter than or equal to the predetermined time X' (S209: NO), the microcomputer 310 executes the process of step S200 again.

If it is determined that the measured time t by the timer 314 is longer than the predetermined time X (S209: YES), the microcomputer 310 gives a notification to a user, etc., to indicate that there is a failure in the compressor in operation that is linked to the flag "1", for example, through the display of the operation panel 32 (S210) and executes the process of step S200 again.

As depicted in FIG. 9, since both the first compressor 101 and the second compressor 201 are operated during a time interval td in accordance with the above process of the microcomputer 310, the detected temperature decreases from T1 to T2 (time interval td).

Although the first compressor 101 at rest during a subsequent time interval ts', since the second compressor 201 is in operation, the detected temperature T decreases from T2 to T4. That is to say, as has been described above, even after being switched from the operation of the two compressors 101, 201 to the operation of one compressor, the detected temperature T will decrease to T4, which is lower than T2, due to, for example, a decrease in the ambient temperature. The process of control mode A has been executed up to this point. As described above, the flag "1" is linked to the second compressor 201 in operation and the flag "0" is linked to the first compressor 101 at rest.

Since both the first compressor 101 and the second compressor 201 are at rest during a subsequent time period tn, the detected temperature T increases from T4 to T1. The process of control mode B is executed from this point.

Although the second compressor 201 is at rest during a subsequent time interval ts, since the first compressor 101 is in operation, the detected temperature T decreases from T1 to T2. As described above, the second compressor 201 linked to the flag "1" is first stopped, and then, the flag "1" is linked to the first compressor 101 in operation and the flag "0" is linked to the second compressor 201 at rest.

Since both the first compressor 101 and the second compressor 201 are at rest during the subsequent time interval tn, the detected temperature T increases from T2 to T1.

Although the first compressor 101 is at rest during the subsequent time interval ts, since the second compressor 201 is in operation, the detected temperature T decreases from T1 to T2. As described above, the first compressor 101 linked to the flag "1" is first stopped and then the flag "1" is linked to the second compressor 201 in operation and the flag "0" is linked to the first compressor 101 at rest.

Similarly, each time the detected temperature T reaches T1, one of the first compressor 101 and the second compressor 201 is alternately started to operate continuously until the detected temperature T reaches T2 (control mode B). That is to say, in control mode B, as depicted in FIG. 9, while the detected temperature is T between T1 and T2, the one-compressor operation of one of the first compressor 101 and the second compressor 201 and the stop of the both compressors are alternately repeated and the first compressor 101 and the second compressor 201 are alternately assigned to the one-compressor operation. Therefore, if the internal load is reduced due to a decrease in ambient temperature, etc., while the refrigerating apparatus 1 is operated in control mode A, the internal temperature may accurately be controlled by switching to the operation in control mode B. A frequency of the period (ts) of operating only one compressor may be maintained at the same level for each of the compressors 101, 201. Therefore, the internal temperature may be accurately controlled while the number of times of activation of the compressors 101, 201 is suppressed, and a biased deterioration between the compressors 101 and 201 can be prevented. This leads to a longer lifetime and maintenance cycle of the refrigerating apparatus 1 and the reduction, etc., of power consumption due to the activation current.

In control mode B, as depicted at steps S209: YES and S210 of FIG. 6, when the time required for the detected temperature T to increase from T1 to T2 during the operation of one compressor is longer than the predetermined time X', which is the reference time, it is determined and notified that the one compressor has failed. For example, in a plot indicating temperature changes between T1 and T2 in FIG. 9, a time interval ts" of a dot-line portion is longer than the time interval ts of other portions and this means that the increase of the internal temperature became slower during the operation of the second compressor 201 due to a decrease in the capacity of the second compressor 201. As a result, since the notification is made when one of the two compressors 101, 201 has failed, the notified user, etc., can identify the failed one and repair/replace this compressor while the cooling capacity of the two refrigerant circuits 100, 200 is maintained at a certain level. Such a failure determination may be implemented without separately providing a sensor for diagnosis, such as pressure sensor, for each of the two compressors 101, 201. Therefore, the decrease of the cooling capacity may be suppressed while suppressing the manufacturing cost of the refrigerating apparatus 1.

In the example of FIG. 6, when the microcomputer 310 determines a failure of the compressors, although the time required for the detected temperature T of the temperature sensor 307 to decrease from T1 to T2 is compared with the predetermined time interval X' that is a reference time interval, it is not limited thereto. For example, the microcomputer (computing device, determining device) 310 may determine a failure by obtaining a rate of change in the detected temperature during the period of operating only one compressor (e.g., (T1−T2)/ts) and comparing the rate with a reference rate. For example, if a rate of decrease of the detected temperature per unit time is smaller than a reference rate of decrease, it is determined that the corresponding compressor has failed. In the example of FIG. 9, since a rate of decrease of the detected temperature during the time interval ts" (>ts) is (T1−T2)/ts" and a rate of decrease of the detected temperature during the time interval ts is (T1−T2)/ts, it is determined that the second compressor 201 corresponding to the former smaller value has failed.

<<Switching of Control Mode from B to A>>

If it is determined that the detected temperature T is higher than T1 at above step S204 of FIG. 6 (S204: YES), the microcomputer 310 determines whether the detected temperature T is lower than T3 (>T1) (S205).

If it is determined that the detected temperature T is lower than T3 (S205: YES), the microcomputer 310 executes the process of step S205 again.

If it is determined that the detected temperature T has reached T3 (not lower than T3) (S205: NO), the microcomputer 310 executes the process of control mode A. That is to say, even after a switch over from the stop of the two compressors 101, 201 to the operation of one compressor, if the detected temperature T increases to T3 (a third temperature), which is higher than T1, due to, for example, an increase in ambient temperature control mode B is switched over to control mode A in which both of the two compressors are operated.

As depicted in FIG. 10, the operation of the refrigerating apparatus 1 is performed in control mode B during a first time interval (ts"+tn+ts') and, during a time interval ts' of the first time interval, the detected temperature T increases to T3 even though the second compressor 201 is in operation. Therefore, the refrigerating apparatus 1 is subsequently operated in control mode A. As a result, even if the internal load is increased due to, for example, an increase in ambient temperature, etc., while the refrigerating apparatus 1 is being operated in control mode B, the internal temperature may be accurately controlled by switching over to the operation in control mode A.

<<Switching of Control Mode from B to C>>

At above step S207 of FIG. 6, if it is determined that the measured time t of the timer 315 is longer than the predetermined time Y (S207: YES), the microcomputer 310 executes the following process of control mode C. That is to say, when a time period during which the detected temperature T is between T1 and T2 is longer than the predetermined time Y, it is determined that the internal temperature has been stabilized within the preset temperature range.

As depicted in FIG. 7, the microcomputer 310 resets the timer 315, causes it to start measuring time (S300), stops the one compressor in operation which is linked to the flag "1", and starts operating the other compressor at rest which is linked to the flag "0" (S301). Then, the microcomputer 310 links the flag "1" to the compressor that has started operating and links the flag "0" to the compressor that has come to a rest (S302).

The microcomputer 310 determines whether the measured time t from the timer 315 which has started measuring at the above step S300 has reached the predetermined time Y (S303).

If it is determined that the measured time t from the timer 315 has reached the predetermined time Y (S303: NO), the microcomputer 310 executes the process of step S300 again.

While the detected temperature T is slowly decreasing from T1 without reaching T2 during the first time zone ts" of FIG. 11, the operation of the second compressor 201 is continued until the operation time reaches the predetermined time Y (i.e., until ts"=Y is satisfied). As described above, the flag "1" is linked to the second compressor 201 in operation and the flag "0" is linked to the first compressor 101 at rest.

When the operation time of the second compressor 201 reaches the predetermined time Y, the second compressor 201 is stopped and the operation of the first compressor 101 is started at the same time. As described above, first, the second compressor 201 linked to the flag "1" is stopped, and then, the flag "1" is linked to the first compressor 101 in operation and the flag "0" is linked to the second compressor 201 at rest.

Subsequently, the first compressor 101 and the second compressor 201 are alternately operated for each of the predetermined times Y. Therefore, a frequency of the period of operating only one compressor may be maintained at the same level for each of the compressors 101, 201. This leads to a longer lifetime and maintenance cycle of the refrigerating apparatus 1.

Since the two compressors 101, 201 are alternately operated in control mode C, a failed compressor may easily be identified from above changes in the detected temperature, for example. The operation time of each of the compressors 101, 201 in control mode C is not limited to the above predetermined time Y and may be different from the predetermined time Y, for example.

On the other hand, if it is determined that the measured time t from the timer 315 has not reached the predetermined time Y at step S303, first, the microcomputer 310 determines whether the detected temperature T from the temperature sensor 307 is lower than T1 (S304) and then whether the detected temperature T is higher than T2 (S305). If it is determined that the detected temperature T has reached T1 (S304: NO), the microcomputer 310 executes the process of step S100 of FIG. 5. This means that a switch over to the mode A is performed, since the cooling capacity of only one of the compressors has become insufficient. If it is determined that the detected temperature T has reached T2 (S305: NO), the microcomputer 310 executes the process of step S200 of FIG. 6. This means that a switch over to the mode B is performed since the cooling capacity is sufficient with only one of the compressors.

<<Switching of Control Mode from A to C>>

At above step S110 of FIG. 5, if it is determined that the measured time t from the timer 315 is longer than the predetermined time Y (S110: YES), the microcomputer 310 executes the following process of control mode C. That is to say, when a time period during which the detected temperature T is between T1 and T2 is longer than the predetermined time Y, it is determined that the internal temperature has been stabilized within the preset temperature range.

The process procedures of the microcomputer 310 in the operation of control mode C are the same as those described above (see FIG. 7).

While the detected temperature T is slowly increasing from T2 without reaching T1 during the first time zone ts" of FIG. 12, the operation of the first compressor 101 is continued until the operation time reaches the predetermined time Y (i.e., until ts"=Y is satisfied). As described above, the flag "1" is linked to the first compressor 101 in operation and the flag "0" is linked to the second compressor 201 at rest.

When the operation time of the first compressor 101 reaches the predetermined time Y, the first compressor 101 is stopped and the operation of the second compressor 201 is started at the same time. As described above, first, the second compressor 201 linked to the flag "1" is stopped and then the flag "1" is linked to the second compressor 201 in operation and the flag "0" is linked to the first compressor 101 at rest.

Subsequently, the first compressor 101 and the second compressor 201 are alternately operated for each of the predetermined times Y. Therefore, a frequency of the period of operating only one compressor can be maintained at the same level for the compressors 101, 201. This leads to a longer lifetime and maintenance cycle of the refrigerating apparatus 1.

Since the two compressors 101, 201 are alternately operated in control mode C, a failed compressor can be easily identified from, for example, above changes in the detected temperature. The operation time of each of the compressors 101, 201 in control mode C is not limited to the above predetermined time Y and may be different from the predetermined time Y, for example.

Among control modes A, B, and C described above, the currently performed mode is, for example, stored in the RAM 313 as a flag (e.g., 0, 1, 2) that is preliminarily linked to each of the modes. The microcomputer 310 refers to this flag on a timely basis.

Other Embodiments

The above embodiments of the present invention are simply for facilitating the understanding of the present invention and are not in any way to be construed as limiting the present invention. The present invention may variously be changed or altered without departing from its spirit and encompass equivalents thereof.

In the above-mentioned embodiment, in order to identify which of the first compressor 101 and the second compressor 201 is in operation, the RAM 313 stores the flag "1" linked to information indicative of the operated compressor and the flag "0" linked to information indicative of the compressor at rest, but it is not limited thereto. For example, the operation state of the compressors 101, 201 may be identified through a predetermined means for detecting whether the compressor relays 305a, 305b and the relays 306a, 306b respectively provided for the compressors 101, 201 are connected or interrupted.

In the above-mentioned embodiment, the display of the operation panel 32 is used as a means that notifies of a failure of the compressors 101, 201, but it is not limited thereto. Such a notifying means may basically be any means as long as it is the means that notifies a user, etc., of which compressor has failed.

In the above embodiment, the first refrigerant circuit 100 and the second refrigerant circuit 200 shown in FIG. 3 are used as two refrigerant circuits, it is not limited thereto. Each of the refrigerant circuits may basically be any refrigerant circuit as long as the refrigerant circuit includes the compressor, the condenser, the pressure reducer, and the evaporator connected circularly with refrigerant pipes and the refrigerant discharged from the compressor is condensed by the condenser and then evaporate by the evaporator to achieve a cooling effect.

Second Embodiment

A refrigerating apparatus is known that includes two refrigerant circuits having compressors, condensers, pressure reducers, and evaporators.

Since the refrigerant is compressed, condensed and then evaporated in each of the two refrigerant circuits, an object to be cooled that is, for example, in thermal contact with the two evaporators in common is refrigerated.

Such a refrigerating apparatus includes fans configured to cool each of the condensers to facilitate the heat exchange in the respective condensers of the two refrigerant circuits. In other words, the two condensers included in the two refrigerant circuits are respectively and individually cooled by the two fans.

In the above refrigerating apparatus, in a case where one of the two fans stops due to a failure of a fan motor, a heat exchange amount between refrigerant and air is decreased in the condenser corresponding to this fan. Therefore, a condensation amount of the refrigerant is decreased in the condenser and an endothermic amount (evaporation amount) of the refrigerant is decreased in the evaporator. This causes a decrease in the cooling capacity of the refrigerant circuit.

Accordingly, in a case where the cooling capacity has decreased in the refrigerant circuit having the condenser corresponding to the stopped fan, even though the refrigerating apparatus has two refrigerating circuits, it becomes substantially equivalent to the case in which the refrigerating apparatus includes only one refrigerant circuit, and the cooling capacity is reduced by half.

In a case where one of the fans fails and stops, the refrigerant pressure is increased on a high-pressure side, and thus a protection device is activated and stops the compressor in operation. After the failure of the fan, the cooling capacity of the refrigerating apparatus is decreased to the level equivalent to that of the case of including only one refrigerant circuit.

It is therefore the object of the present invention to maintain the cooling capacity of the refrigerating apparatus higher than the case of the operation with only one refrigerant circuit even if one of the two fans stops during the operation of the two refrigerant circuits of the refrigerating apparatus.
=Refrigerating Apparatus=

A refrigerating apparatus of a second embodiment has the same constituents as the constituents depicted in FIGS. 1 and 2 of the first embodiment and explanations for the same reference numerals will be omitted. The operation panel 32 is electrically connected, through a predetermined wiring (not depicted), to a control unit (e.g., the control board 301) integrally controlling, for example, the first compressor 101 and the second compressor 201, and a predetermined temperature sensor (not depicted) provided in the storage chamber 51.

Figure 13:
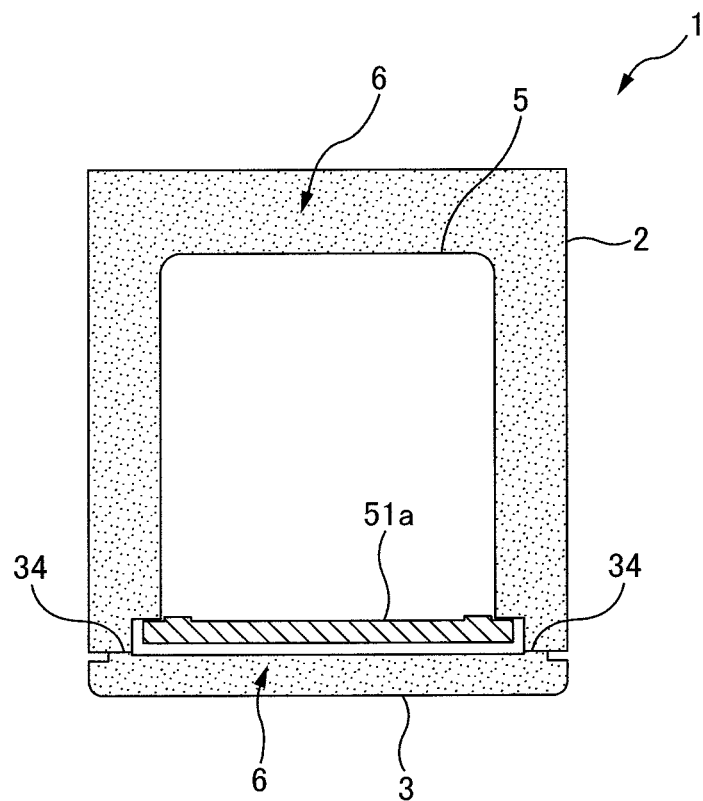
FIG. 13 is a cross-sectional view taken along A-A' of the refrigerating apparatus of FIG. 1.

In the second embodiment, as depicted in FIG. 13, the outer surface of the inner case 5 and the inner surface of the outer case 2 are spaced by a predetermined distance and the gap therebetween is filled with a heat insulating material 6 to enhance the refrigerating efficiency of the inner case 5. The insulating material 6 is for example, a polyurethane resin insulating material and a vacuum heat insulating material made of glass wool. As depicted in FIG. 13, the inside of the outer door 3 is also filled with the insulating material 6 and, therefore, the insulation is provided between the inner door 51a and the outer door 3. As depicted in FIGS. 1 and 2, the inner case 5 and the machine chamber 4 are spaced by a predetermined distance and the insulation is provided in a similar way as above.
=Refrigerant Circuit=

A refrigerant circuit of a second embodiment has the same constituents as a refrigerant circuit 150 depicted in FIG. 3 of the first embodiment and a control circuit controlling the refrigerant circuit of the second embodiment has substantially the same constituents as the control circuit 300 of the first embodiment. In other words, in the case of the first embodiment, the temperature sensor 307 is connected to the control board 301 whereas, in the case of the second embodiment, the control board 301 is, instead of the temperature sensor 307, connected to a first compressor temperature sensor 307A, a second compressor temperature sensor 307B, a first temperature sensor 307C, a second temperature sensor 307D, a first sensor 307E, and a second sensor 307F. Explanations for the same reference numerals will be omitted.

Figure 14B:
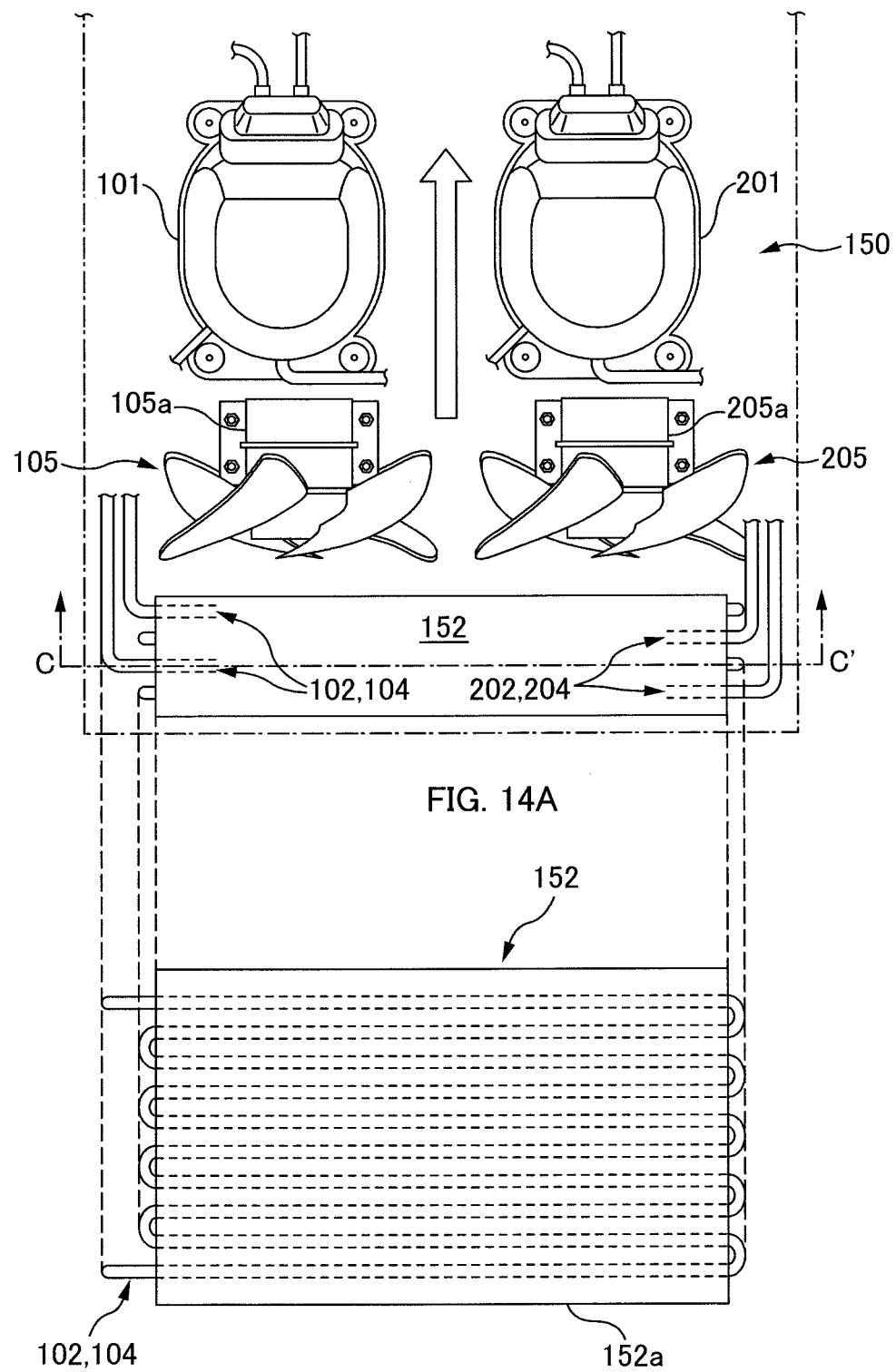
FIG. 14B is a front view of the condensing unit of FIG. 14A.

An exemplary configuration of the refrigerant circuit 150 of the second embodiment will be described with reference to FIGS. 3 and 4 of the first embodiment and FIGS. 14A and 14B of the second embodiment. FIG. 14A is a plan view of an exemplary arrangement of the first compressor 101 and the second compressor 201, the first fan 105 and the second fan 205, and a condensing unit 152 of the refrigerant circuit 150 of FIG. 3. This plan view is a diagram taken along B-B' of FIG. 1 when the circuit is viewed in the direction of arrows. FIG. 14B is a front view of the condensing unit 152 of FIG. 14A. Dotted lines in this plan view is a diagram taken along C-C' of FIG. 14A when the pre-condenser 102 and the condenser 104 are viewed in the direction of arrows.

In the second embodiment, the refrigerant used in the refrigerant circuit 150 is a zeotropic refrigerant mixture including R245fa, R600, R23, and R14, for example. R245fa denotes pentafluoropropane ($CHF_2CH_2CF_3$) and the boiling point is +15.3° C. (degrees Celsius). R600 denotes n-butane (n-$C_4H_{10}$) and the boiling point is -0.5° C. R23 denotes trifluoromethane ($CHF_3$) and the boiling point is -82.1° C. R14 denotes tetrafluoromethane ($CF_4$) and the boiling point is -127.9° C.

R600 has a high boiling point (evaporating temperature) and easily contain oil, water, etc. R245fa is a refrigerant mixed with R600, which is combustible, at a predetermined ratio (e.g., a ratio of R245fa to R600 is 7:3) to make R600 incombustible.

In the first refrigerant circuit 100, the refrigerant compressed by the first compressor 101 radiates heat, condenses, turns to a liquid phase in the pre-condenser 102 and the condenser 104, is then subjected to a water removal process by the dehydrator 106, and is divided by the flow divider 107 into a refrigerant in a liquid state (mainly R245fa and R600 having higher boiling points) and a refrigerant in a gas state (R23, R14). In the second embodiment, the refrigerant that has radiated heat in the pre-condenser 102 cools the oil in the first compressor 101 with the oil cooler 101a and then radiates heat again in the condenser 104.

The divided refrigerant in the liquid state (mainly R245fa, R600) is depressurized by the pressure reducer 108 and evaporated in the outer pipe 109a of the heat exchanger 109.

While passing through the inner pipe 109b of the heat exchanger 109, the divided refrigerant in the gas state (R23, R14) is cooled and condensed into the liquid state due to the heat of evaporation of the refrigerant (R245fa, R600) that has evaporated in the above outer pipe 109a and the gas-phase refrigerant (R23, R14) returned from the first evaporator 111 described later. The refrigerant that has not evaporated in the first evaporator 111 is evaporated at this point.

The same applies to the second refrigerant circuit 200.

As described above, since the boiling points of R245fa, R600, R23, and R14 are about 15° C., about 0° C., about -82° C., and about -128° C., respectively, the refrigerant circuits 100 and 200 cools R23 and R14 of the zeotropic refrigerant mixture with an evaporating effect of R600 and guides and evaporates R23 and R14 turned to the liquid phase into the evaporating unit 153 (the first evaporator 111 and the second evaporator 211), and thus the object to be cooled can be cooled to a temperature corresponding to the boiling points of R23 and R14 (e.g., about -82° C. to -128° C.), for example. The non-evaporated refrigerant in the first evaporator 111 and the second evaporator 211 is evaporated at the heat exchangers 109, 209.

<<Condensing Unit, Fans and Compressor>>

As depicted in FIG. 14A, the refrigerating apparatus 1 is provided with the first fan 105 and the second fan 205 configured to cool the pre-condenser 102 and the condenser 104 of the first refrigerant circuit 100 and the pre-condenser 202 and the condenser 204 of the second refrigerant circuit 200. The first fan 105 and the second fan 205 of the second embodiment are propeller air blowers having the fan motors 105a and 205a, respectively. The first fan 105 and the second fan 205 form a single air passage through which the air flow, with a housing making up the machine chamber 4 serving as a fan casing.

As depicted in FIG. 14A, the pre-condenser 102 and the condenser 104 of the first refrigerant circuit 100 and the pre-condenser 202 and the condenser 204 of the second refrigerant circuit 200 are bundled by the common tube plate 152a of a substantially rectangular parallelepiped shape and make up the condensing unit 152. As depicted in FIG. 14B, each of the pre-condenser 102 and the condenser 104 forms a refrigerant flow channel meandering in parallel with the substantially rectangular front surface of the condensing unit 152. This configuration is similar to the pre-condenser 202 and the condenser 204 and these four condensers 102, 104, 202, 204 are formed as parallel lines (four lines) in the condensing unit 152 from the front surface to the rear surface in parallel with the front surface of the substantially rectangular shape. Each of the four lines of the condensers 102, 104, 202, 204 is disposed to face both of the first fan 105 and the second fan 205 that are disposed in parallel behind the condensing unit 152. That is to say, in the substantially rectangular parallelepiped condensing unit 152, the pre-condenser 102 and the condenser 104 depicted by dot-lines in FIG. 14B extend from the left end to the right end of the plane of FIG. 14B, meander by turning back at each end portion, and extend from the upper side to the lower side of the plane of FIG. 14B. The pre-condenser 202 and the condenser 204 that are not depicted in FIG. 14B have a similar shape. The pre-condenser 102 and the condenser 104 are disposed in parallel in the second and fourth lines from the lower side of the plane of FIG. 14A in the substantially rectangular parallelepiped condensing unit 152 and the pre-condenser 202 and the condenser 204 are disposed in parallel in the first and third lines from the lower side of the plane of FIG. 14A in the substantially rectangular parallelepiped condensing unit 152.

The pre-condenser 102 and the condenser 104 are not limited to such a configuration and may, in the substantially rectangular parallelepiped condensing unit 152, extend from the left end of the plane of FIG. 14B to a position beyond the horizontal center portion of the condensing unit 152, for example, and may meander by turning back at each of the left end and the position beyond the horizontal center portion. That is to say, the pre-condenser 102 and the condenser 104 may form a shape substantially entirely facing the first fan 105 and partially facing the second fan 205, for example. The same applies to the pre-condenser 202 and the condenser 204.

As depicted in FIG. 14A, both the first fan 105 and the second fan 205 are disposed in parallel to face the rear surface of the condensing unit 152. The first compressor 101 is disposed behind the first fan 105 and the second compressor 201 is disposed behind the second fan 205. The condensing unit 152, the first fan 105 and the second fan 205, as well as the first compressor 101 and the second compressor 201 depicted in FIG. 14A are disposed on the same horizontal plane.

With such an arrangement, in the second embodiment, for example, the first fan 105 forms an air passage that lies along substantially the whole of the rear surface of the condensing unit 152 and, via the first fan 105, covers substantially the whole of the first compressor 101 including at least a portion of the second compressor 201. Similarly, in the second embodiment, the second fan 205 forms an air passage that lies along substantially the whole of the rear surface of the condensing unit 152 and, via the second fan 205, covers substantially the whole of the second compressor 201 including at least a portion of the first compressor 101.

In the second embodiment, a direction of blowing air by the first fan 105 and the second fan 205 is a direction from the front side to the rear side of the refrigerating apparatus 1 (an outline arrow of FIG. 14A).

<<Control Circuit>>

The microcomputer 310 in the control board 301 outputs a control signal for opening/closing each of two the relays 306a, 306b and outputs a control signal for starting or stopping the operation of the fan motors 105a, 205a based on detection signals from the first compressor temperature sensor 307A and the second compressor temperature sensor 307B. The first compressor temperature sensor 307A detects the temperature of the first compressor 101 and the second compressor temperature sensor 307B detects the temperature of the second compressor 201.

When it is detected that the temperature of the first compressor 101 detected by the first compressor temperature sensor 307A has exceeded a predetermined temperature during the operation of the first compressor 101, the microcomputer 310 operates the compressor relay 305a corresponding to the first compressor 101, through the relay 306a corresponding to the first compressor 101, to interrupt the input of the three-phase voltage to the first compressor 101. This provides the function as a protection circuit concerning a temperature increase of the first compressor 101, and the same applies to the second compressor 201. When the power switch 304 is turned on, the first compressor 101 and the second compressor 201 are supplied with electric power through the three-phase power cable 303 to start a refrigerant compression operation. Although not depicted, for example, the microcomputer 310 compares the internal temperature detected by the first temperature sensor 307C with a temperature determined in advance and controls the rotation speed of a motor (not depicted) of the first compressor 101 depending on the comparison result. This controls the compression ability of the first compressor 101 depending on the internal temperature and the same applies to the second compressor 201. The first temperature sensor 307C and the second temperature sensor 307D may be the same sensor.

As depicted in FIG. 4, the microcomputer 310 controls the fan motors 105a, 205a separately from the control of the first compressor 101 and the second compressor 201 described above. Although not depicted, the microcomputer 310 stops the operation of the fan motor 105a when it is detected that the temperature of the first fan 105 detected by the first sensor 307E has exceeded a temperature determined in advance, for example. This provides the function as a protection circuit related to a temperature increase of the first fan 105 and the same applies to the second fan 205. The first sensor 307E and the second sensor 307F may be implemented by sharing a single sensor provided in the vicinity of both of the fan motors 105a, 205a, for example.

In the second embodiment, for example, even if there is a failure in the fan motors 105a, 205a, the first compressor 101 and the second compressor 201 in operation continue the refrigerant compression operation irrespectively.

According to the configuration described above, since the first and second condensers are disposed in an area in which the air passage formed by the first fan 105 and the air passage formed by the second fan 205 are identical even if one of the fans stops blowing air, the both condensers are cooled by the air blown from the other fan. The first compressor 101 is disposed to face the first fan 105 and the second compressor 201 is disposed to face the second fan 205.

The first fan 105 and the second fan 205 located in parallel are disposed to face the first compressor 101 and the second compressor 201, respectively, in the same air passage, if one of the first fan 105 and the second fan 205 rotates, even the compressor (the first compressor 101 or the second compressor 201) not facing this fan at least partially receives air and is cooled.

Further, the control circuit 300 is configured such that, for example, even if there is a failure in the fan motors 105a, 205a, the first compressor 101 and the second compressor 201 in operation continue the operation irrespectively. That is to say, the first fan 105 and the second fan 205 rotate separately from the first compressor 101 and the second compressor 201.

Therefore, even if one of the fans (the first fan 105 or the second fan 205) is stopped during the operation of the refrigerating apparatus 1, the cooling capacity is maintained at a cooling capacity exceeding the capacity by only one refrigerant circuit.

As above, the refrigerating apparatus 1 of the second embodiment at least includes the first refrigerant circuit 100 having the first compressor 101, the first condenser (such as the pre-condenser 102 and the condenser 104), and the first evaporator 111, the second refrigerant circuit 200 having the second compressor 201, the second condenser (such as the pre-condenser 202 and the condenser 204), and the second evaporator 211, the first fan 105 operating separately from the first compressor 101 and the second compressor 201, and the second fan 205 operating separately from the first compressor 101 and the second compressor 201, and the first and second condensers as well as the first fan 105 and the second fan 205 may be arranged in such a manner that in a case where one of the fans (the first fan 105 or the second fan 205) stops while both the first refrigerant circuit 100 and the second refrigerant circuit 200 are in operation, the other fan cools both the first condenser and the second condenser.

With this refrigerating apparatus 1, even if one of the first fan 105 and the second fan 205 stops during the operation of the first refrigerant circuit 100 and the second refrigerant circuit 200, the operation of both of the refrigerant circuits 100, 200 are continued while the other fan is cooling both the first and second condensers. Therefore, even if one of the fans stops, the cooling capacity of the refrigerating apparatus 1 including the two refrigerant circuits 100, 200 can be maintained higher than that of a case in which only one refrigerant circuit is provided, for example.

In the above refrigerating apparatus 1, the first and second compressors and the first fan 105 and the second fan 205 are arranged in such a manner that in a case where one of the fans stops while both the first refrigerant circuit 100 and the second refrigerant circuit 200 are operating, the other fan cools both the first compressor 101 and the second compressor 201.

With this refrigerating apparatus 1, even if one of the fans stops during the operation of the first refrigerant circuit 100 and the second refrigerant circuit 200, the other fan cools the first compressor 101 and the second compressor 201 and the increase in temperature of the compressors can be suppressed.

In the above refrigerating apparatus 1, the first fan 105 and the second fan 205 are arranged in parallel and the first and second condensers are arranged to face both the first fan 105 and the second fan 205.

With this refrigerating apparatus 1, since the first and second condensers are disposed in the area where the air passage formed by the first fan 105 and the air passage formed by the second fan 205 are the same, even if one of the fans stops blowing air, the both condensers are cooled by the air blown from the other fan.

Other Embodiments

The above embodiments of the present invention are simply for facilitating the understanding of the present invention and are not in any way to be construed as limiting the present invention. The present invention may variously be changed or altered without departing from its spirit and encompass equivalents thereof.

In the above embodiment, the first refrigerant circuit 100 and the second refrigerant circuit 200 are substantially identical unitary refrigerant circuits, but it is not limited thereto, and, for example, the refrigerant circuits may have configurations, capacities, etc., that are different from each other.

In the above embodiment, the heat exchangers 109, 209 are of the double-pipe type having the outer pipes 109a, 209a and the inner pipes 109b, 209b, but it is not limited thereto, and, for example, the heat exchangers may be of the multi-pipe type or the plate type.

In the above embodiment, the refrigerant is a zeotropic refrigerant mixture including R245fa, R600, R23, and R14, but it is not limited thereto. For example, R245fa and R600 may be those having a boiling point at which they come to a substantially liquid state when condensed by the condensing unit 152. For example, R23 and R14 may be those refrigerants having a boiling point at which they remain in a substantially gaseous state when condensed by the condensing unit 152 but come to a substantially liquid state in the heat exchangers 109, 209.

In the above embodiment, the condensing unit 152, the first fan 105, and the second fan 205 are disposed on the same horizontal plane, but it is not limited thereto. For example, the disposition planes may be located at different levels as long as the fans (the first fan 105 and the second fan 205) are located and oriented in such a manner that air can be blown to the condensing unit 152.

In the above embodiment, the first fan 105 and the second fan 205 are propeller air blowers having the fan motors 105a and 205a, respectively, but it is not limited thereto. The fans may basically have a predetermined configuration for cooling the condensing unit 152.

The refrigerating apparatus of the second embodiment is applicable to the refrigerating apparatus of the first embodiment.

Third Embodiment

A refrigerating apparatus is known that includes two refrigerant circuits having compressors, condensers, pressure reducers, and evaporators. In each of the two refrigerant circuits, the refrigerant discharged from the compressor is cooled and liquefied by the condenser and, via the pressure reducer, evaporated by the evaporator, and thus, for example, an internal portion of a cold storage cabinet in thermal contact with the two evaporators in common is cooled.

This refrigerating apparatus includes fans configured to facilitate the cooling of the refrigerant for the respective condensers of the two refrigerant circuits. The two respective fans individually blow air to the two condensers included in the two refrigerant circuits to facilitate the heat exchange between the ambient air and the refrigerant.

Since the role of the fans is important for the heat exchange of the condenser as above, the refrigerating apparatus always monitors whether a fan motor that rotates each of the fans has failed. For example, the refrigerating apparatus detects respective temperatures of the outlet portions of the two condensers by a predetermined temperature sensor and, for example, in a case where the temperature of the outlet portion of one condenser has exceeded a predetermined temperature, it is determined that the corresponding fan motor has failed. Such a failure detecting method is based on a relationship between the fans and the condensers that when the fan stop due to a failure in the fan motor, the temperature of the outlet portion is increased since the condenser is not sufficiently cooled. When a failure of the fan motor is detected, the refrigerating apparatus notifies a user, etc., of the failure through a predetermined notifying means.

In the above refrigerating apparatus, for example, in a case where one of the two fans has stopped due to a failure of a fan motor, a heat exchange amount between refrigerant and air is reduced in the condenser that should receive air blown by this fan under normal conditions and, therefore, a condensation amount of the refrigerant is reduced in the condenser. This is problematic since an endothermic amount (evaporation amount) of the refrigerant is reduced in the evaporator of the corresponding refrigerant circuit, resulting in reduction of the cooling capacity of the refrigerating apparatus.

As described above, in a case where the increase in temperature of the outlet portion of the condenser is taken into consideration in determining that the corresponding fan motor has failed, since the cooling capacity of the refrigerating apparatus has already been reduced at the time of detection and notification of the failure, it is problematic that the detection and notification of the failure does not lead to a suppression of the decrease of the cooling capacity of the refrigerating apparatus.

It is therefore the object of the present invention to suppress the decrease of the cooling capacity of the refrigerating apparatus due to a failure of a fan motor.

=Configuration of Refrigerating Apparatus=

Figure 15:
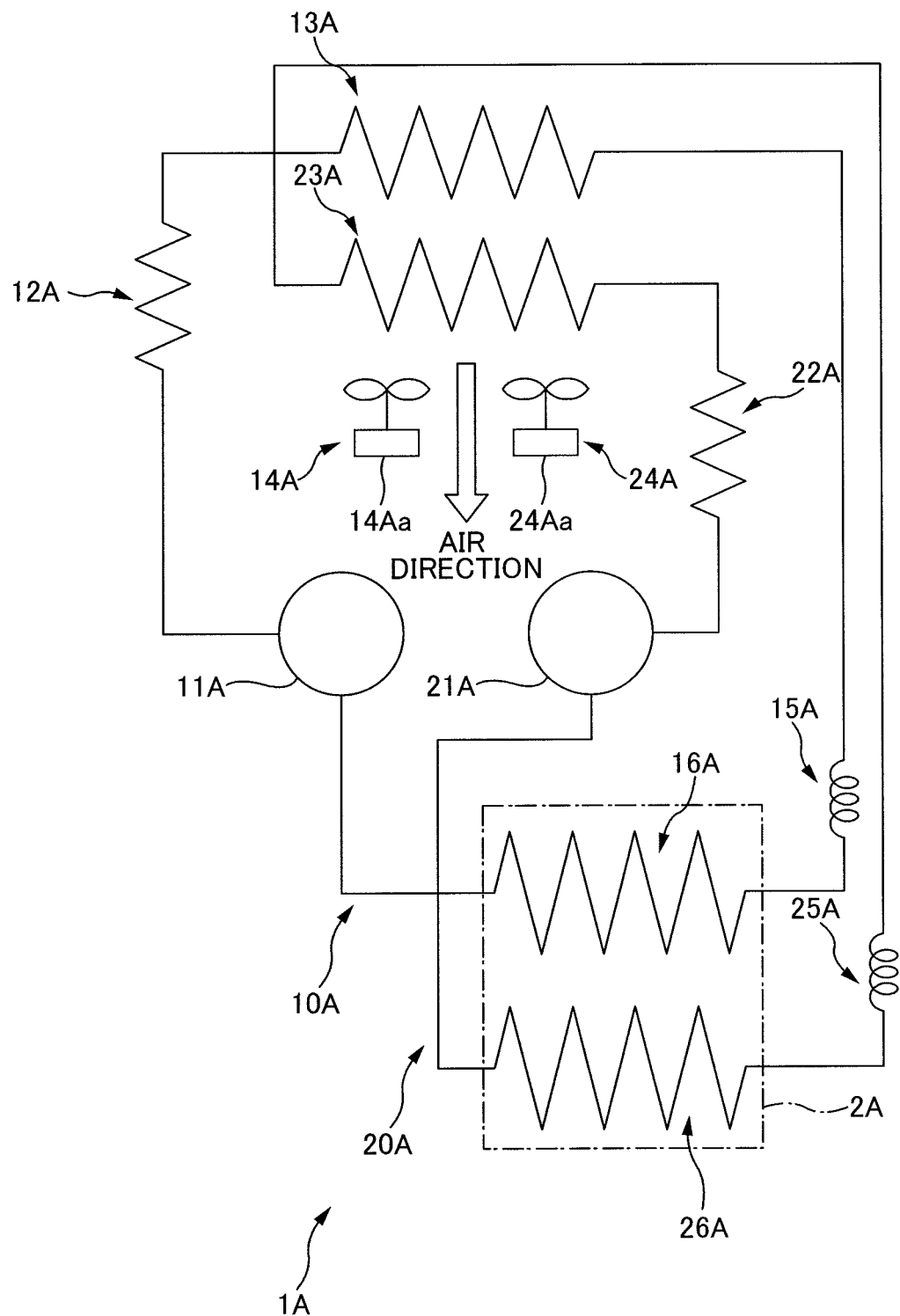
FIG. 15 is a circuit diagram of an example of a first refrigerant circuit and a second refrigerant circuit of a refrigerating apparatus of a third embodiment.
Figure 16:
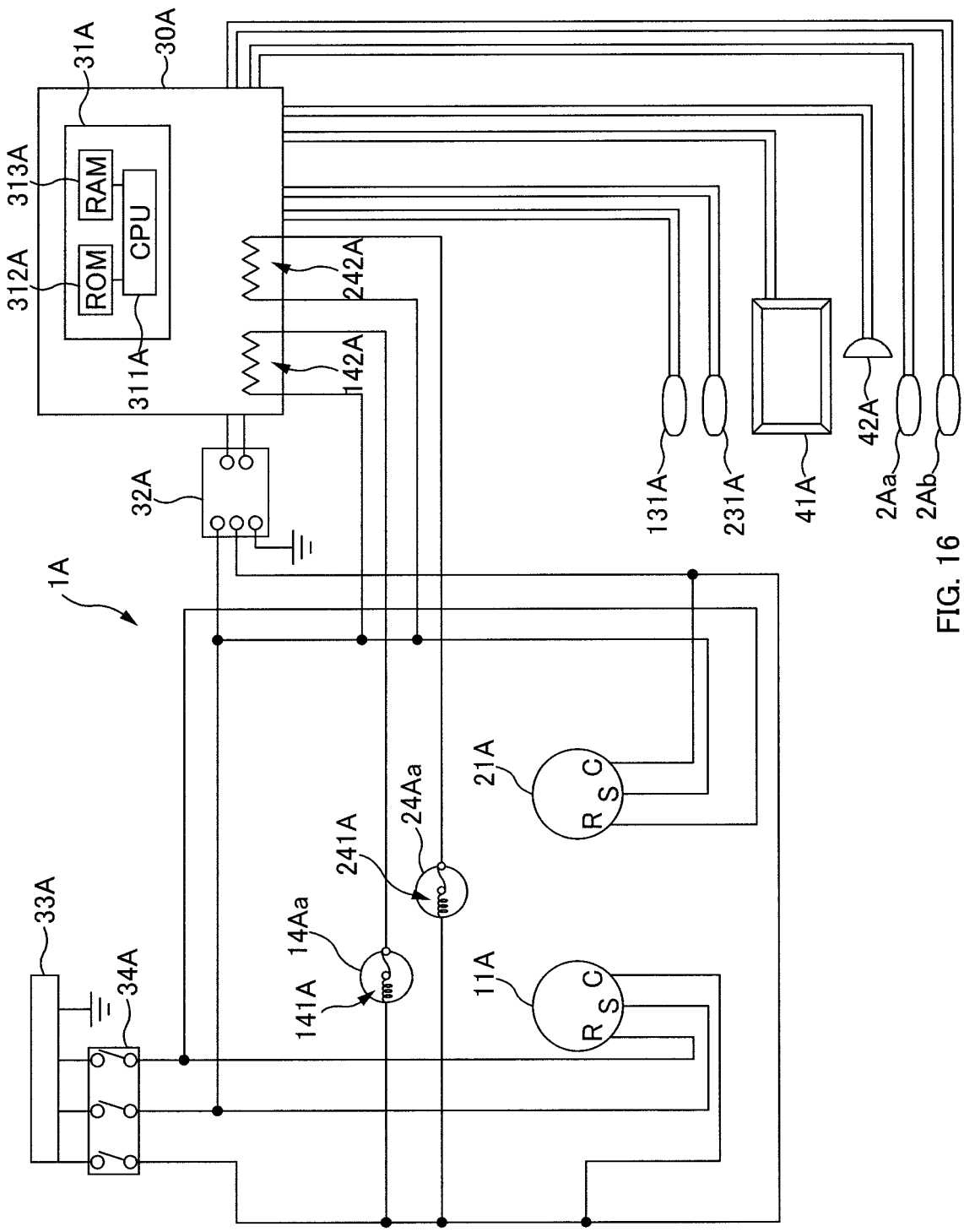
FIG. 16 is a block diagram of an example of a control circuit responsible for controlling the first refrigerant circuit and the second refrigerant circuit of the third embodiment.

An exemplary configuration of a refrigerating apparatus 1A of a third embodiment will be described with reference to FIGS. 15 and 16. FIG. 15 is a circuit diagram of an example of a first refrigerant circuit 10A and a second refrigerant circuit 20A of the refrigerating apparatus 1A of the third embodiment. FIG. 16 is a block diagram of an example of a control circuit responsible for controlling the first refrigerant circuit 10A and the second refrigerant circuit 20A of the third embodiment.

As depicted in FIGS. 15 and 16, the refrigerating apparatus 1A includes two substantially the same refrigerant circuits (the first refrigerant circuit 10A and the second refrigerant circuit 20A), a first temperature sensor 2Aa and a second temperature sensor 2Ab that detect an internal temperature of a cold storage cabinet 2A, a first fan 14A and a first fan motor 14Aa, a second fan 24A and a second fan motor 24Aa, a thermal fuse 141A (a third temperature sensor) of the first fan motor 14Aa, a thermal fuse 241A (a fourth temperature sensor) of the second fan motor 24Aa, a first current transformer 142A (a detecting device) that detects the current of the first fan motor 14Aa, a second current transformer 242A (a detecting device) that detects the current of the second fan motor 24Aa, and a microcomputer 31A (a control device). The refrigerating apparatus 1A includes a temperature sensor 131A and a temperature sensor 231A that detect a temperature of an outlet portion of a condenser 13A and a temperature of an outlet portion of a condenser 23A, respectively, and also includes a display (a notifying device) 41A and a buzzer 42A (a notifying device) as a means for notifying a user, etc., of a failure of the fan motors 14Aa, 24Aa.

As depicted in FIG. 15, the first refrigerant circuit 10A includes a first compressor 11A, a pre-condenser 12A and a condenser 13A (a first condenser), a pressure reducer 15A, and a first evaporator 16A and is circularly configured with a predetermined pipe (a first refrigerant pipe) in such a manner that refrigerant discharged from the first compressor 11A returns to the same compressor 11A again.

The first compressor 11A compresses and discharges the sucked refrigerant to the pre-condenser 12A.

The pre-condenser 12A is, for example, a pipe made of copper or aluminum that is meandered and configured to radiate heat of the refrigerant discharged from the first compressor 11A.

The condenser 13A is, for example, a pipe made of copper or aluminum that is meandered and configured to further radiate heat of the refrigerant output from the pre-condenser 12A.

The first pressure reducer 15A is, for example, a capillary tube that depressurizes the refrigerant changed into the liquid phase due to heat radiation and condensation in the condenser 13A and outputs the refrigerant to the first evaporator 16A.

The first evaporator 16A is, for example, a pipe made of copper or aluminum configured to evaporate (vaporize) the refrigerant depressurized by the first pressure reducer 15A and is affixed to the outer surface of the cold storage cabinet 2A of the refrigerating apparatus 1A in a thermally contacting manner. That is to say, the inside of the cold storage cabinet 2A is cooled due to the cooling effect at the time of evaporation of the refrigerant by the first evaporator 16A. The refrigerant evaporated and changed into the gas phase is sucked into the first compressor 11A.

The same applies to the second refrigerant circuit 20A. The second refrigerant circuit 20A includes a second compressor 21A, a pre-condenser 22A and a condenser 23A (a second condenser), a second pressure reducer 25A, and a second evaporator 26A and is circularly connected with a predetermined pipe (a second refrigerant pipe) in such a manner that the refrigerant discharged from the second compressor 21A returns to the same compressor 21A again.

The condensers 13A, 23A are integrally provided on the same tube plate, for example, and are adjacently arranged in sequence on the tube plate in the same air passage of the first fan 14A and the second fan 24A as described later. The temperature sensor 131A and the temperature sensor 231A described above are attached to the outlet portion of the condenser 13A and the outlet portion of the condenser 23A, respectively, and the temperature sensors 131A, 231A are electrically connected to the control board 30A as depicted in FIG. 16. Further, the first evaporator 16A and the second evaporator 26A are disposed to concurrently refrigerate the inside of the cold storage cabinet 2A. That is to say, each of the first evaporator 16A and the second evaporator 26A is made up of one evaporation pipe (not depicted) and these two evaporation pipes are, for example, attached to the outer surface of the cold storage cabinet 2A in a thermally contacting manner without overlapping each other.

The first temperature sensor 2Aa and the second temperature sensor 2Ab are electrically connected to the control board 30A as depicted in FIG. 16. Although the first temperature sensor 2Aa is a sensor configured to control the first compressor 11A of the first refrigerant circuit 10A and the second temperature sensor 2Ab is a sensor configured to control the second compressor 21A of the second refrigerant circuit 20A, both of the sensors 2Aa, 2Ab detect the internal temperature of the same cold storage cabinet 2A. Both of the sensors 2Aa, 2Ab may be implemented by sharing a single sensor.

As depicted in FIG. 15, the first fan 14A and the second fan 24A are air blowers configured to blow air to the condenser 13A and the condenser 23A, respectively, to facilitate the heat radiation of the refrigerant. As schematically depicted in FIG. 15, the condensers 13A, 23A are adjacently arranged in sequence in the same air passage formed by the first fan 14A and the second fan 24A located in parallel, and the fans 14A, 24A are arranged in parallel so that air may be sent to both of the condensers 13A, 23A. As schematically depicted in FIG. 15, the first fan 14A and the second fan 24A are arranged to face the first compressor 11A and the second compressor 21A, respectively. In the third embodiment, the direction of air blown by the first fan 14A and the second fan 24A is a direction that is directed from the condensers 13A, 23A to the compressors 11A, 21A (see an outline arrow of FIG. 15).

As depicted in FIG. 15, the first fan motor 14Aa and the second fan motor 24Aa are power sources rotating the first fan 14A and the second fan 24A, respectively. As depicted in FIG. 16, the first fan motor 14Aa has the thermal fuse 141A therein and the second fan motor 24Aa has the thermal fuse 241A therein. In the third embodiment, the thermal fuses 141A, 241A are configured to be interrupted due to the increase in temperature of the first fan motor 14Aa and the second fan motor 24Aa in association with the increase in temperature of the condenses 13A, 23A when both the first fan 14A and the second fan 24A are stopped during the operation of the first refrigerant circuit 10A and the second refrigerant circuit 20A.

As depicted in FIG. 16, the first current transformer 142A and the second current transformer 242A are mounted on the control board 30A and are transformers that convert the current flowing through the first fan motor 14Aa and the current flowing through the second fan motor 24Aa into respective voltages and output the voltages to the microcomputer 31A. These current transformers 142A, 242Aa are serially connected to the fan motors 14Aa, 24Aa, respectively. For example, in a case where a lock current is flowing in the fan motors 14Aa, 24Aa, the voltage values of the corresponding current transformers 142A, 242A turn to values corresponding to the lock current and, for example, if no current is flowing due to disconnection of a circuit related to the fan motors 14Aa, 24Aa, the voltage values of the corresponding current transformers 142A, 242A turn to zero. That is to say, the operation states of the fan motors 14Aa, 24Aa can be directly detected respectively by referring to the voltage values of the current transformers 142A, 242A. This improves the accuracy of the failure detection of the fan motors 14Aa, 24Aa.

The microcomputer 31A is mounted on the control board 30A as depicted in FIG. 16 and includes a CPU 311A, a ROM 312A, a RAM 313A, etc., to control the operation of the first compressor 11A and the second compressor 21A depending on the detection output of the first temperature sensor 2Aa and the second temperature sensor 2Ab, to control the operation of the first fan motor 14Aa and the second fan motor 24Aa depending on interruption/disinterruption by the thermal fuses 141A, 241A, and to monitor the operation state of the first fan motor 14Aa and the second fan motor 24Aa based on the detection output of the first current transfer 142A and the second current transfer 242A. The CPU 311A executes processes related to the control and monitoring described above, the ROM 312A stores programs, etc., for the CPU 311A to execute such processes, and the RAM 313A stores data necessary for such processes.

For example, during the operation of the first refrigerant circuit 10A, the microcomputer 31A compares the internal temperature detected by the first temperature sensor 2Aa with a predetermined temperature preliminarily stored in the RAM 313A, stops the operation of the first compressor 11A through a predetermined relay (not depicted) if it is determined that the internal temperature is lower than or equal to the predetermined temperature and starts the operation of the first compressor 11A through the predetermined relay if it is determined that the internal temperature is higher than the predetermined temperature. The same applies to the control of the operation of the second compressor 21A based on the detection output of the second temperature sensor 2Ab. However, it is not limited thereto and, for example, if it is determined that the internal temperature is lower than or equal to than the predetermined temperature, either one of the compressors 11A, 21A may be stopped. As above, to keep the internal temperature of the cold storage cabinet 2A constant, the microcomputer 31A intermittently operates the first compressor 11A and the second compressor 21A.

For example, in a case where the microcomputer 31A detects the interruption of the thermal fuse 141A of the first fan motor 14Aa from the fact that the voltage value of the first current transformer 142A is zero, the microcomputer 31A stops applying the voltage to the first fan motor 14Aa through a predetermined relay (not depicted). The same applies when stop applying the voltage to the second fan motor 24Aa based on the interruption of the thermal fuse 241A of the second fan motor 24Aa.

As depicted in FIG. 16, the first compressor 11A, the second compressor 21A, the first fan motor 14Aa, the second fan motor 24Aa, and a switching power source 32A are supplied with electric power through a three-phase power cable 33A and a power switch 34A. The control board 30A, etc., are supplied with electric power through the switching power source 32A.

As above, since the first fan 14A and the second fan 24A are arranged to face the condenser 13A as depicted in FIG. 15, even if one of the fans stops blowing air, the condenser 13A is cooled by the air blown from the other fan. The same applies to the condenser 23A. As depicted in FIG. 15, since the first fan 14A and the second fan 24A located in parallel are disposed to face the first compressor 11A and the second compressor 21A, respectively, if one of the first fans 14A, 24A is rotating, the compressor 11A, 21A not facing this fan at least partially receives air and is cooled. As depicted in FIG. 16, while the power supply to the first fan motor 14Aa and the second fan motor 24Aa is stopped by an interruption of the respective internal thermal fuses 141A, 241A therein, the power supply to the first compressor 11A and the second compressor 21A is stopped by the microcomputer 31A based on the detection output of the first temperature sensor 2Aa and the second temperature sensor 2Ab. That is to say, the operation control for the fan motors 14Aa, 24Aa and the operation control of the compressors 11A, 21A are independent of each other. Therefore, even if one of the fans 14A, 24A stops during the operation of the refrigerating apparatus 1A, since the operation of the compressor 11A, 21A of the corresponding refrigerant circuit 10A, 20A is not correspondingly stopped, the cooling capacity of the refrigerating apparatus 1A is maintained at a level exceeding the cooling capacity of only one of the refrigerant circuits 10A, 20A.

==Operation of Refrigerating Apparatus==

Figure 17:
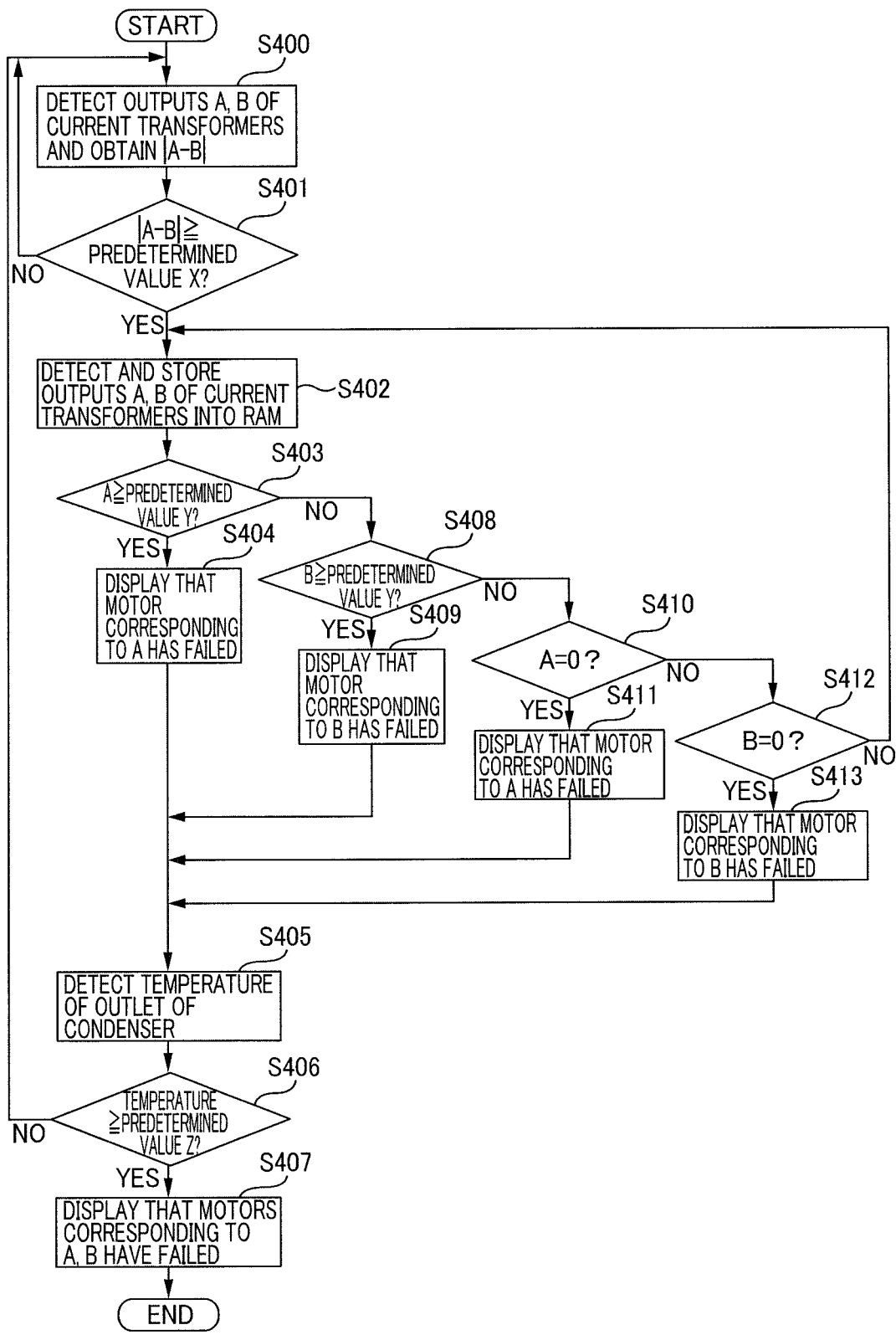
FIG. 17 is a flowchart of an example of a process procedure of a microcomputer in detecting and notifying of a failure by the refrigerating apparatus of the third embodiment.

Referring to FIG. 17, description will be made of an operation in which the refrigerating apparatus 1 having the above configuration detects a failure of the first fan motor 14Aa and the second fan motor 24Aa and makes a notification thereof. FIG. 17 is a flowchart illustrating an example of process procedures of the microcomputer 31A in the case of detection and notification of failure by the refrigerating apparatus 1A of the third embodiment.

The microcomputer 31A obtains an absolute value of a difference value between values A, B of the respective voltages outputted from the first current transformer 142A and the second current transformer 242A (S400).

The microcomputer 31A determines whether the absolute value of the difference value obtained at step S400 is greater than or equal to a predetermined value X preliminarily stored in the RAM 313A (S401). This predetermined value X is a value determined in advance based on a voltage difference between the first current transformer 142A and the second current transformer 242A that may occur in a case where one of the first current transformer 142A and the second current transformer 242A is stopped and the other one is rotating. The predetermined value X of the present embodiment is, for example, a smaller one of the following two values. That is, a first value is a value obtained by subtracting, from a voltage value corresponding to the lock current flowing through the stopped one of the two fan motors 14Aa, 24Aa, a voltage value corresponding to the current flowing through the other rotating one of the two fan motors 14Aa, 24Aa that is rotating. A second value is a voltage value corresponding to the current flowing through the rotating one of the two fan motors 14Aa, 24Aa. Since no current flows through the other stopped one of the two fan motors 14Aa, 24Aa, the corresponding voltage value is zero.

If it is determined that the absolute value of the difference value obtained at step S400 is less than the predetermined value X (S401: NO), the microcomputer 31A executes the process of step S400 again. That is to say, the microcomputer 31A determines that the operation state of the two fan motors 14Aa, 24Aa is a state in which both of the fan motors are rotating and continues to monitor the operation state of the two fan motors 14Aa, 24Aa.

If it is determined that the absolute value of the difference value obtained at step S400 is greater than or equal to the predetermined value X (S401: YES), the microcomputer 31A stores the values A, B of the voltages respectively outputted from the first current transformer 142A and the second current transformer 242A into the RAM 313A in such a manner that they correspond to information indicating the corresponding fan motors 14Aa, 24Aa (S402). That is to say, the microcomputer 31A determines that the operation state of the two fan motors 14Aa, 24Aa is a state in which one of the fan motors is stopped and the other is rotating and determines which of the fan motor 14Aa or 24Aa has failed based on the individual voltage values A, B of the current transformers 142A, 242A as described later.

The microcomputer 31A determines whether the voltage value A of the first current transformer 142A corresponding to the first fan motor 14Aa is greater than or equal to a predetermined value Y preliminarily stored in the RAM 313A (S403). The predetermined value Y is a voltage value corresponding to the lock current in a case where the first fan motor 14Aa is stopped and the lock current is applied to the first current transformer 142A. If it is determined that the voltage value A of the first current transformer 142A is greater than or equal to the predetermined value Y (S403: YES), the microcomputer 31A displays on the display 41A that the first fan motor 14Aa (the motor corresponding to A) has failed and set off the buzzer 42A, for example, for a predetermined time measured by a predetermined timer (not depicted) (S404), and executes the process of step S405 described later. That is to say, in this case, it is determined that at least the first fan 14A is stopped due to the lock of the first fan motor 14Aa and a user, etc., are notified of this determination result.

If it is determined that the voltage value A of the first current transformer 142A is less than the predetermined value Y (S403: NO), the microcomputer 31A determines whether the voltage value B of the second current transformer 242A corresponding to the second fan motor 24Aa is greater than or equal to a predetermined value Y preliminarily stored in the RAM 313A (S408). The predetermined value Y is a voltage value corresponding to the lock current in a case where the second fan motor 24Aa is stopped and the lock current is flowing through the second current transformer 242A. If it is determined that the voltage value B of the second current transformer 242A is greater than or equal to the predetermined value Y (S408: YES), the microcomputer 31A displays on the display 41A that the second fan motor 24Aa (the motor corresponding to B) has failed and sets off the buzzer 42A, for example, for a predetermined time (S409), and executes the process of step S405 described later. That is to say, in this case, it is determined that at least the second fan 24A is stopped due to the lock of the second fan motor 24Aa and a user, etc., are notified of this determination result.

If it is determined that the voltage value B of the second current transformer 242A is less than the predetermined value Y (S408: NO), the microcomputer 31A determines whether the voltage value A of the first current transformer 142A corresponding to the first fan motor 14Aa is zero (S410). If it is determined that the voltage value A of the first current transformer 142A is zero (S410: YES), the microcomputer 31A displays on the display 41A that the first fan motor 14Aa (the motor corresponding to A) has failed and sets off the buzzer 42A, for example, for a predetermined time (S411), and executes the process of step S405 described later. In this case, it is determined that at least the first fan 14A is stopped, for example, due to disconnection, etc., of a circuit related to the first fan motor 14Aa and a user, etc., are notified of this determination result.

If it is determined that the voltage value A of the first current transformer 142A is not zero (i.e., greater than zero) (S410: YES), the microcomputer 31A determines whether the voltage value B of the second current transformer 242A corresponding to the second fan motor 24Aa is zero (S412). If it is determined that the voltage value B of the second current transformer 242A is zero (S412: YES), the microcomputer 31A displays on the display 41A that the second fan motor 24Aa (the motor corresponding to B) has failed and sets off the buzzer 42A, for example, for a predetermined time (S413), and executes the process of step S405 described later. In this case, it is determined that at least the second fan 24A is stopped, for example, due to disconnection, etc., of a circuit related to the second fan motor 24Aa and a user, etc., are notified of this determination result.

If it is determined that the voltage value B of the second current transformer 242A is not zero (i.e., greater than zero) (S412: NO), the microcomputer 31A executes the process of step S402 again. The microcomputer 31A newly samples the respective voltage values A, B of the first current transformer 142A and the second current transformer 242A and, based on the new voltage values A, B, determines again which of the fan motor 14Aa or 24Aa has failed.

As above, since the notification is made at the time one of the two fan motors 14Aa, 24Aa has failed, the notified user, etc., can identify the failed one and repair/replace this fan motor while the other fan motor is in operation to maintain the heat exchange amount of the both condensers 13A, 23A. This leads to suppression in the reduction of the cooling capacity of the refrigerating apparatus 1A. Setting off the buzzer 42A for a predetermined time prompts the user, etc., to see the display on the display 41A and this further ensures the notification of the failure. At steps S400 and S401, since a determination is first made on whether at least one of the fan motors 14A, 24A has failed based only on the difference value of the voltage values A, B of the two current transformers 142A, 242A, the microcomputer 31A requires a smaller process load. That is to say, the processing capacity of the CPU 311A, the capacity of the RAM 313A, etc., can be suppressed to reduce the manufacturing cost of the refrigerating apparatus 1A.

In the third embodiment, in a case where a notification is made that one of the two fan motors 14Aa, 24Aa has failed (S404, S409, S411, or S413), the microcomputer 31A refers to the temperature of the outlet portion of the condenser 13A and the temperature of the outlet portion of the condenser 23A respectively detected by the temperature sensor 131A and the temperature sensor 231A (S405) and executes the following process based on these temperatures.

The microcomputer 31A determines whether the two temperatures detected at step S405 are greater than or equal to a predetermined value Z preliminarily stored in the RAM 313A (S406). The predetermined value Z is a value corresponding to the temperatures in a case where the temperatures has increased in the outlet portions of the condensers 13A, 23A due to a failure in both of the first fan motor 14Aa and the second fan motor 24Aa.

For example, if it is determined that one of the two temperatures is less than the predetermined value Z (S406: NO), the microcomputer 31A executes the process of step S400 again.

For example, if it is determined that the two temperatures are greater than or equal to the predetermined value Z (S406: YES), the microcomputer 31A changes a display on the display 41A at above steps S404, S409, S411, or S413 to a display that there is a failure in the first fan motor 14Aa and the second fan motor 24Aa (the motors corresponding to A, B), sets off the buzzer 42A, for example, for a predetermined time (S407), and terminates the process. In this case, it is determined that both of the first fan 14A and the second fan 24A are stopped, for example, due to the lock of one of the two fan motors 14Aa, 24Aa and the disconnection of the other, and that, as a result, the temperatures of the outlet portions of the condensers 13A, 23A are greater than or equal to the predetermined temperature, and a user, etc., are notified of this determination result.

In the third embodiment, for example, in a case where the temperatures have increased in the condensers 13A, 23A due to the locking of the two fan motors 14Aa, 24Aa, since the temperatures of the two fan motors 14Aa, 24Aa also correspondingly increase, the thermal fuses 141A, 241A are interrupted. Therefore, the lock current that was flowing in the fan motors 14Aa, 24Aa turns to zero. Such operation control of the fan motors 14Aa, 24Aa enables the avoidance of wasteful power consumption due to the lock current.

However, neither the state in which the lock current is flowing through the two fan motors 14Aa, 24Aa nor the state in which the current is not flowing through the two fan motors 14Aa, 24Aa due to the interruption of the thermal fuses 141A, 241A can be determined with the process of above step S401. That is to say, the difference value of the voltage values A, B of the two current transformers 142A, 242A is substantially zero in either case.

Therefore, although not depicted, the microcomputer 31A is configured to execute a process similar to the above steps S405 to S407, for example, at each of the predetermined time intervals measured by a predetermined timer (not depicted) separately from the process of the above step S401 and the subsequent processes. That is to say, the microcomputer 31A regularly determines the presence of failure of the both fan motors 14Aa, 24Aa from the detection of temperatures of the outlet portions of the condensers 13A, 23A and if it is determined that there is a failure in both of them, a user, etc., are notified of the failure. Alternatively, the microcomputer 31A may regularly determine the presence of failure of the both fan motors 14Aa, 24Aa from the detection of voltages of the two current transformers 142A, 242A. That is to say, if the both voltage values A, B are zero, it is determined that there is a failure in the both fan motors 14Aa, 24Aa.

Other Embodiments

The above embodiments of the present invention are simply for facilitating the understanding of the present invention and are not in any way to be construed as limiting the present invention. The present invention may variously be changed or altered without departing from its spirit and encompass equivalents thereof.

Although only the condensers 14A, 23A are integrally provided on the same tube plate and are adjacently arranged in sequence on the tube plate in the same air passage of the first fan 14A and the second fan 24A in the above embodiment, it is not limited thereto. For example, the pre-condensers 12A, 22A may also integrally be provided on the same tube plate as the condensers 13A, 23A and may adjacently be arranged in sequence on the tube plate in the same air passage of the first fan 14A and the second fan 24A.

In the above embodiment, although the notifying devices are the display 41A and the buzzer 42A, it is not a limited thereto and may be basically any means for notifying a user, etc., of the failure of the fan motors 14Aa, 24Aa. Although the notification only indicates which of the fan motors 14Aa, 24Aa has failed, it is not limited thereto and, for example, details of the failure based on the voltage values A, B of the current transformers 142A, 242A may be added (such as the lock or the disconnection of the circuit).

In the above embodiment, although the processes of steps S405 to S407 by the microcomputer 31A are executed after the respective processes of steps S404, S409, S411, and S413, it is not limited thereto.

Figure 18:
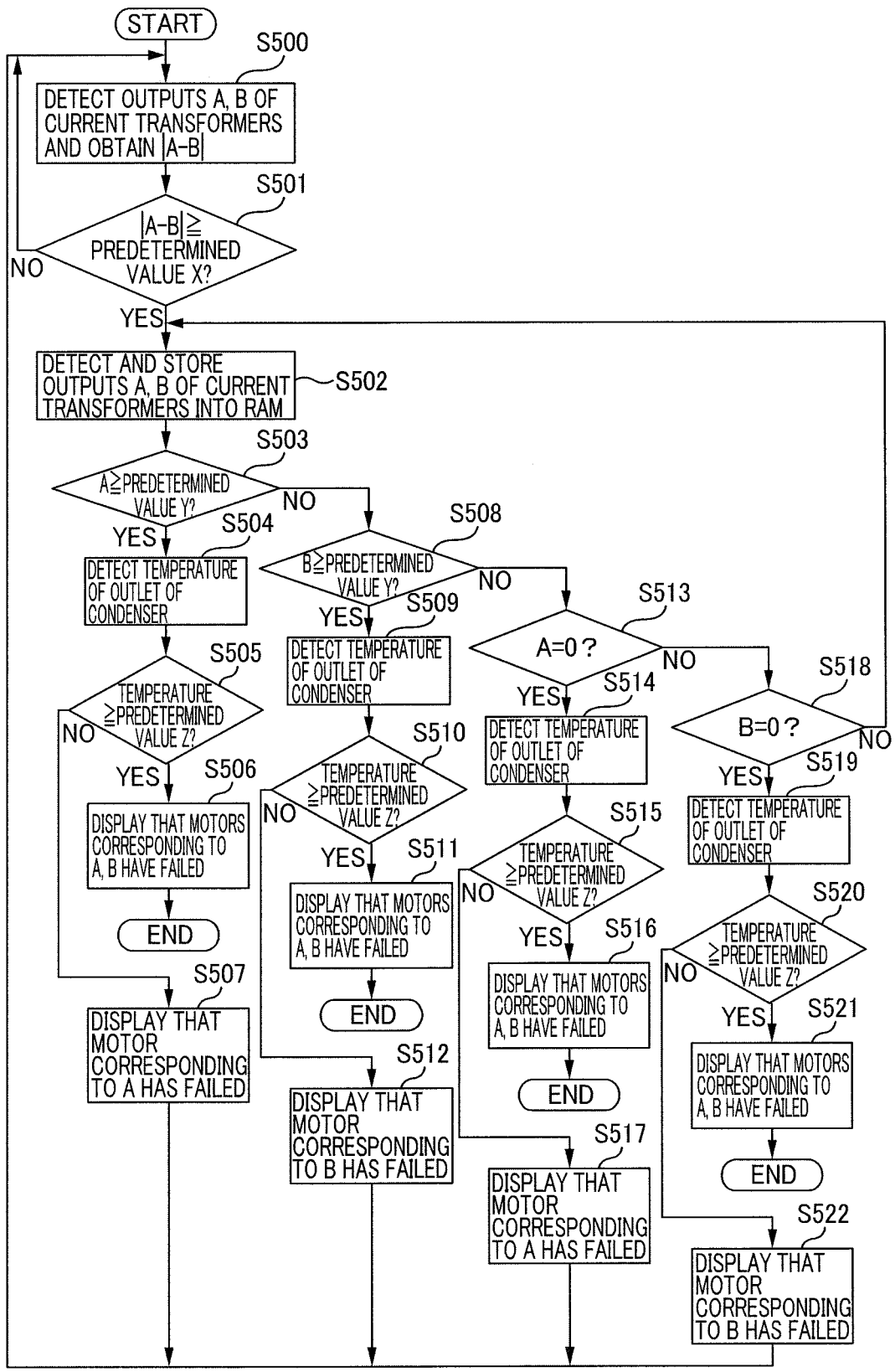
FIG. 18 is a flowchart of another example of a process procedure of the microcomputer in detecting and notifying of a failure by the refrigerating apparatus of the third embodiment.

Hereinafter, as depicted in FIG. 18, the microcomputer 31A may, after having determined that one of the fan motors has failed, the microcomputer 31A may determine the presence of a failure of the other fan motor and then make a notification of the final determination result (one has failed or both have failed) only once.

FIG. 18 is a flowchart of another example of process procedures of the microcomputer 31A in the case of detection and notification of failure by the refrigerating apparatus 1A of the third embodiment. The processes of steps S500 to S502 of FIG. 18 are the same as the respective processes of steps S400 to S402 of FIG. 17. The determination processes of steps S503, S508, S513, and S518 of FIG. 18 are the same as the respective determination processes of steps S403, S408, S410, and S412 of FIG. 17. That is to say, with these processes, it is determined which of the two fan motors 14Aa, 24Aa has a failure and whether the failure is the lock or the disconnection of the circuit.

If it is determined that the voltage value A of the first current transformer 142A is greater than or equal to the above predetermined value Y (S503: YES), the microcomputer 31A refers to the temperatures of the outlet portions of the condensers 13A, 23A respectively detected by the temperature sensors 131A, 231A (S504) and determines whether the two temperatures are greater than or equal to the above predetermined value Z (S505). For example, if it is determined that one of the two temperatures is less than the predetermined value Z (S505: NO), the microcomputer 31A displays on the display 41A that the first fan motor 14Aa (the motor corresponding to A) has failed and sets off the buzzer 42A, for example, for a predetermined time (S507), and executes the process of step S500 again. On the other hand, for example, if it is determined that the two temperatures are greater than or equal to the predetermined value Z (S505: YES), the microcomputer 31A displays on the display 41A that there is a failure in both of the fan motors 14Aa, 24Aa (the motors corresponding to A, B), sets off the buzzer 42A, for example, for a predetermined time (S506), and terminates the process.

If it is determined that the voltage value B of the second current transformer 242A is greater than or equal to the above predetermined value Y (S508: YES), the microcomputer 31A refers to the temperatures of the outlet portions of the condensers 13A, 23A in a manner similar to the above (S509) and determines whether the two temperatures are greater than or equal to the above predetermined value Z (S510). If it is determined that one of the two temperatures is less than the predetermined value Z (S510: NO), the microcomputer 31A makes a notification in a manner similar to the above to indicate that the second fan motor 24Aa (the motor corresponding to B) has failed (S512), and executes the process of step S500 again. On the other hand, if it is determined that the two temperatures are greater than or equal to the predetermined value Z (S510: YES), the microcomputer 31A makes a notification in a manner similar to the above to indicate that there is a failure in both of the fan motors 14Aa, 24Aa (the motors corresponding to A, B) (S511) and terminates the process.

If it is determined that the voltage value A of the first current transformer 142A is zero (S513: YES), the microcomputer 31A refers to the temperatures of the outlet portions of the condensers 13A, 23A in a manner similar to the above (S514) and determines whether the two temperatures are greater than or equal to the above predetermined value Z (S515). If it is determined that one of the two temperatures is less than the predetermined value Z (S515: NO), the microcomputer 31A makes a notification in a manner similar to the above to indicate that the first fan motor 14Aa (the motor corresponding to A) has failed (S517), and executes the process of step S500 again. On the other hand, if it is determined that the two temperatures are greater than or equal to the predetermined value Z (S515: YES), the microcomputer 31A makes a notification in a manner similar to the above to indicate that there is a failure in both of the fan motors 14Aa, 24Aa (the motors corresponding to A, B) (S516) and terminates the process.

If it is determined that the voltage value B of the second current transformer 242A is zero (S518: YES), the microcomputer 31A refers to the temperatures of the outlet portions of the condensers 13A, 23A in a manner similar to the above (S519) and determines whether the two temperatures are greater than or equal to the above predetermined value Z (S520). If it is determined that one of the two temperatures is less than the predetermined value Z (S520: NO), the microcomputer 31A makes a notification in a manner similar to the above to indicate that the second fan motor 24Aa (the motor corresponding to B) has failed (S522), and executes the process of step S500 again. On the other hand, if it is determined that the two temperatures are greater than or equal to the predetermined value Z (S520: YES), the microcomputer 31A makes a notification in a manner similar to the above to indicate that there is a failure in both of the fan motors 14Aa, 24Aa (the motors corresponding to A, B) (S521), and terminates the process.

With the above process, in a case where the failure of both of the fan motors 14Aa, 24Aa is displayed, an instruction for displaying the failure of the one fan motor on the display 41 can be skipped at the previous step and, therefore, the program can correspondingly be simplified.

The refrigerating apparatus of the third embodiment is applicable to the refrigerating apparatus of the first embodiment.

What is claimed is:

1. A refrigerating apparatus comprising:
a first refrigerant circuit including a first compressor, a first condenser, a first pressure reducer, and a first evaporator, connected circularly with a first refrigerant pipe, a refrigerant discharged from the first compressor being condensed at the first condenser and thereafter evaporated at the first evaporator to acquire a cooling effect;
a second refrigerant circuit including a second compressor, a second condenser, a second pressure reducer, and a second evaporator, connected circularly with a second refrigerant pipe, a refrigerant discharged from the second compressor being condensed at the second condenser and thereafter evaporated at the second evaporator to acquire a cooling effect;
a temperature sensor configured to detect a temperature of an internal portion of a cold storage cabinet, the first evaporator and the second evaporator being disposed to cool the internal portion at the same time; and
a first control device configured to perform control so that at least one of the first compressor and the second compressor must be operated, wherein
the first control device is further configured to control the first compressor and the second compressor in such a manner that both the first compressor and the second compressor are operated each time a temperature detected by the temperature sensor reaches a first temperature, and only one of the first compressor and the second compressor is operated as well as the first compressor and the second compressor are alternately operated, each time a temperature detected by the temperature sensor reaches a second temperature lower than the first temperature.

2. The refrigerating apparatus according to claim 1, further comprising:
a second control device configured to control the first compressor and the second compressor in such a manner that the first compressor and the second compressor start being alternately operated each time a temperature detected by the temperature sensor reaches the first temperature, and are continuously operated until the detected temperature reaches the second temperature; and
a first switching device configured to switch over a control by the second control device to a control by the first control device when a temperature detected by the temperature sensor reaches a third temperature higher than the first temperature, and switch over a control by the first control device to a control by the second control device when a temperature detected by the temperature sensor reaches a fourth temperature lower than the second temperature.

3. The refrigerating apparatus according to claim 2, comprising:
a timer configured to measure a time during which a temperature detected by the temperature sensor is a temperature between the first temperature and the second temperature, when the first compressor and the second compressor start being alternately operated; and
a second switching apparatus configured to switch between an operation of the first compressor and an operation of the second compressor, when the measured time of the timer has exceeded a predetermined time.

4. The refrigerating apparatus according to claim 1, wherein:
the first evaporator and the second evaporator are disposed so as to cool a same internal portion at the same time,
the temperature sensor includes a first temperature sensor and a second temperature sensor for controlling respective operations of the first compressor and the second compressor to enable detection of a temperature of the same internal portion,
a first fan and a second fan are disposed in parallel so as to blow air to the first condenser and the second condenser adjacently disposed in sequence in a same air passage,
the refrigerating apparatus further comprises a second control device configured to control the first fan and the second fan based on respective temperatures detected by the first sensor and the second sensor,
the first fan and the second fan are disposed to face the first condenser, and
in an air passage, the first fan and the second fan face the first compressor and the second compressor, respectively.

5. The refrigerating apparatus according to claim 1, comprising:
a first temperature sensor and a second temperature sensor configured to serve as the temperature sensor configured to detect the temperature of the internal portion of the cold storage cabinet;
a first fan;
a second fan;
a first fan motor configured to rotate the first fan;
a second fan motor configured to rotate the second fan;
a third temperature sensor configured to detect a temperature of the first fan motor;
a fourth temperature sensor configured to detect a temperature of the second fan motor;
a detecting device configured to detect a current of the first fan motor and a current of the second fan motor; and
a second control device, wherein:
the first evaporator and the second evaporator are disposed to cool the internal portion at the same time,
the first fan and the second fan are disposed in parallel so as to blow air to the first condenser and the second condenser adjacently disposed in sequence in a same air passage of the first fan and the second fan, and
the second control device is configured to control respective operations of the first compressor and the second compressor depending on detection outputs of the first temperature sensor and the second temperature sensor, control respective operations of the first fan motor and the second fan motor depending on detection outputs of the third temperature sensor and the fourth temperature sensor, and monitor operation states of the first fan motor and the second fan motor based on the detection output of the detecting device to make a notification of failure of the first fan motor and the second fan motor.

6. The refrigerating apparatus according to claim 5, wherein:
the detecting apparatus includes a first current transformer and a second current transformer configured to detect a current of the first fan motor and a current of the second fan motor, respectively, as voltages, and
the second control device is configured to monitor the operation states of the first fan motor and the second fan motor based on the voltages of the first current transformer and the second current transformer.

7. The refrigerating apparatus according to claim 6, wherein the second control device determines whether the first fan motor and the second fan motor has failed based on a difference value between a voltage of the first current transformer and a voltage of the second current transformer.

8. The refrigerating apparatus according to claim 7, wherein in a case where an absolute value of the difference value is greater than a predetermined value, the second control device determines that either or both of the first fan motor and the second fan motor has or have failed.

9. A refrigerating apparatus comprising:
a first refrigerant circuit including a first compressor, a first condenser, a first pressure reducer, and a first evaporator, connected circularly with a first refrigerant pipe, a refrigerant discharged from the first compressor being condensed at the first condenser and thereafter evaporated at the first evaporator to acquire a cooling effect;
a second refrigerant circuit including a second compressor, a second condenser, a second pressure reducer, and a second evaporator, connected circularly with a second refrigerant pipe, a refrigerant discharged from the second compressor being condensed at the second condenser and thereafter evaporated at the second evaporator to acquire a cooling effect;
a temperature sensor configured to detect a temperature of an internal portion of a cold storage cabinet, the first evaporator and the second evaporator being disposed to cool the internal portion at the same time;
a first control device configured to control the first compressor and the second compressor in such a manner that both the first compressor and the second compressor are operated each time a temperature detected by the temperature sensor reaches a first temperature, and the first compressor and the second compressor are alternately operated each time a temperature detected by the temperature sensor reaches a second temperature lower than the first temperature;
a second control device configured to control the first compressor and the second compressor in such a manner that the first compressor and the second compressor start being alternately operated each time a temperature detected by the temperature sensor reaches the first temperature, and are continuously operated until the detected temperature reaches the second temperature; and
a first switching device configured to switch over a control by the second control device to a control by the first control device when a temperature detected by the temperature sensor reaches a third temperature higher than the first temperature, and switch over a control by the first control device to a control by the second control device when a temperature detected by the temperature sensor reaches a fourth temperature lower than the second temperature.

10. The refrigerating apparatus according to claim 9, further comprising:
a timer configured to measure a time during which a temperature detected by the temperature sensor is a temperature between the first temperature and the second temperature, when the first compressor and the second compressor start being alternately operated; and
a second switching apparatus configured to switch between an operation of the first compressor and an operation of the second compressor, when the measured time of the timer has exceeded a predetermined time.

11. A refrigerating apparatus comprising:
a first refrigerant circuit including a first compressor, a first condenser, a first pressure reducer, and a first evaporator, connected circularly with a first refrigerant pipe, a refrigerant discharged from the first compressor being condensed at the first condenser and thereafter evaporated at the first evaporator to acquire a cooling effect;
a second refrigerant circuit including a second compressor, a second condenser, a second pressure reducer, and a second evaporator, connected circularly with a second refrigerant pipe, a refrigerant discharged from the second compressor being condensed at the second condenser and thereafter evaporated at the second evaporator to acquire a cooling effect;
a temperature sensor configured to detect a temperature of an internal portion of a cold storage cabinet, the first evaporator and the second evaporator being disposed to cool the internal portion at the same time; and
a first control device configured to control the first compressor and the second compressor in such a manner that both the first compressor and the second compressor are operated each time a temperature detected by the temperature sensor reaches a first temperature, and the first compressor and the second compressor are alternately operated each time a temperature detected by the temperature sensor reaches a second temperature lower than the first temperature, wherein:
the first evaporator and the second evaporator are disposed so as to cool a same internal portion at the same time,
the temperature sensor includes a first temperature sensor and a second temperature sensor for controlling respective operations of the first compressor and the second compressor to enable detection of a temperature of the same internal portion,
a first fan and a second fan are disposed in parallel so as to blow air to the first condenser and the second condenser adjacently disposed in sequence in a same air passage,
the refrigerating apparatus further comprises a second control device configured to control the first fan and the second fan based on respective temperatures detected by the first sensor and the second sensor,
the first fan and the second fan are disposed to face the first condenser,
in an air passage, the first fan and the second fan face the first compressor and the second compressor, respectively.

12. A refrigerating apparatus comprising:
a first refrigerant circuit including a first compressor, a first condenser, a first pressure reducer, and a first evaporator, connected circularly with a first refrigerant pipe, a refrigerant discharged from the first compressor being condensed at the first condenser and thereafter evaporated at the first evaporator to acquire a cooling effect;
a second refrigerant circuit including a second compressor, a second condenser, a second pressure reducer, and a second evaporator, connected circularly with a second refrigerant pipe, a refrigerant discharged from the second compressor being condensed at the second condenser and thereafter evaporated at the second evaporator to acquire a cooling effect;
a temperature sensor configured to detect a temperature of an internal portion of a cold storage cabinet, the first evaporator and the second evaporator being disposed to cool the internal portion at the same time;
a first control device configured to control the first compressor and the second compressor in such a manner that both the first compressor and the second compressor are operated each time a temperature detected by the temperature sensor reaches a first temperature, and the first compressor and the second compressor are alternately operated each time a temperature detected by the temperature sensor reaches a second temperature lower than the first temperature;

a first temperature sensor and a second temperature sensor configured to serve as the temperature sensor configured to detect the temperature of the internal portion of the cold storage cabinet;
a first fan;
a second fan;
a first fan motor configured to rotate the first fan;
a second fan motor configured to rotate the second fan;
a third temperature sensor configured to detect a temperature of the first fan motor;
a fourth temperature sensor configured to detect a temperature of the second fan motor;
a detecting device configured to detect a current of the first fan motor and a current of the second fan motor; and
a second control device, wherein:
the first evaporator and the second evaporator are disposed to cool the internal portion at the same time,
the first fan and the second fan are disposed in parallel so as to blow air to the first condenser and the second condenser adjacently disposed in sequence in a same air passage of the first fan and the second fan, and
the second control device is configured to control respective operations of the first compressor and the second compressor depending on detection outputs of the first temperature sensor and the second temperature sensor, control respective operations of the first fan motor and the second fan motor depending on detection outputs of the third temperature sensor and the fourth temperature sensor, and monitor operation states of the first fan motor and the second fan motor based on the detection output of the detecting device to make a notification of failure of the first fan motor and the second fan motor.

13. The refrigerating apparatus according to claim 12, wherein:
the detecting apparatus includes a first current transformer and a second current transformer configured to detect a current of the first fan motor and a current of the second fan motor, respectively, as voltages, and
the second control device is configured to monitor the operation states of the first fan motor and the second fan motor based on the voltages of the first current transformer and the second current transformer.

14. The refrigerating apparatus according to claim 13, wherein the second control device determines whether the first fan motor and the second fan motor has failed based on a difference value between a voltage of the first current transformer and a voltage of the second current transformer.

15. The refrigerating apparatus according to claim 14, wherein in a case where an absolute value of the difference value is greater than a predetermined value, the second control device determines that either or both of the first fan motor and the second fan motor has or have failed.

* * * * *